United States Patent
Rico Alvarino et al.

(10) Patent No.: US 10,182,364 B2
(45) Date of Patent: Jan. 15, 2019

(54) PERFORMING A CHANNEL STATE INFORMATION MEASUREMENT IN AN ENHANCED MACHINE-TYPE COMMUNICATION

(71) Applicant: QUALCOMM Incorporated, San Diego, CA (US)

(72) Inventors: Alberto Rico Alvarino, San Diego, CA (US); Wanshi Chen, San Diego, CA (US); Peter Gaal, San Diego, CA (US); Hao Xu, San Diego, CA (US); Aitzaz Ahmad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/402,927

(22) Filed: Jan. 10, 2017

(65) Prior Publication Data
US 2017/0289829 A1    Oct. 5, 2017

Related U.S. Application Data

(60) Provisional application No. 62/317,338, filed on Apr. 1, 2016.

(51) Int. Cl.
| | |
|---|---|
| *H04W 24/08* | (2009.01) |
| *H04W 4/70* | (2018.01) |
| *H04W 72/04* | (2009.01) |
| *H04B 7/06* | (2006.01) |
| *H04L 1/00* | (2006.01) |
| *H04B 17/309* | (2015.01) |

(52) U.S. Cl.
CPC .......... *H04W 24/08* (2013.01); *H04B 7/0626* (2013.01); *H04B 17/309* (2015.01); *H04L 1/0026* (2013.01); *H04W 4/70* (2018.02); *H04W 72/042* (2013.01); *H04W 72/0446* (2013.01)

(58) Field of Classification Search
None
See application file for complete search history.

(56) References Cited

U.S. PATENT DOCUMENTS

2018/0014219 A1*    1/2018    Takeda .................. H04W 24/10

OTHER PUBLICATIONS

International Search Report and Written Opinion—PCT/US2017/014917—ISA/EPO—dated May 8, 2017.
(Continued)

*Primary Examiner* — Christine T Duong
(74) *Attorney, Agent, or Firm* — Nerrie M. Zohn

(57) ABSTRACT

The present disclosure proposes indicating to the UE a set of CSI reference subframes that may be used in performing a CSI measurement. The set of CSI reference subframes may be measured over multiple frequencies when frequency hopping occurs. In an aspect of the disclosure, a method, a computer-readable medium, and an apparatus are provided. The apparatus may receive information associated with a number of CSI reference subframes to use in performing CSI measurements in a narrowband communication. In addition, the apparatus may monitor subframes on at least two frequency channels including a PDCCH. Further, the apparatus may perform a CSI measurement across the at least two frequency channels based on the information associated with the number of CSI reference subframes.

22 Claims, 17 Drawing Sheets

(56) References Cited

OTHER PUBLICATIONS

Mediatek Inc: "Discussion on Open Issues for CSI Measurement and Reporting", 3gpp Draft, R1-157381, Discussion on Open Issues for CSI Measurement and Reporting, 3rd Generation Partnership Project (3gpp), Mobile Competence Centre, 650, Route Des Lucioles, F-06921, Sophia-Antipo, vol. RAN WG1, No. Malmo, Sweden, Oct. 5, 2015-Oct. 9, 2015, Nov. 15, 2015 (Nov. 15, 2015), XP051003565, Retrieved from the Internet: URL: http://www.3gpp.org/ftp/Meetings_3GPP_SYNC/RAN1/Docs/ [retrieved on Nov. 15, 2015].

NTT DOCOMO: "Summary of Offline Discussion on CSI Definition and Formats", 3gpp Draft, R1-157347 Summary of UCI, 3rd Generation Partnership Project (3gpp), Mobile Competence Centre, 650, Route Des Lucioles, F-06921 Sophia-Antipolis, Cedex, France, vol. RAN WG1, No. Anaheim, USA, Nov. 15, 2015-Nov. 22, 2015, Nov. 24, 2015 (Nov. 24, 2015), XP051022845. Retrieved from the Internet: URL: http://Www.3gpp.Org/Ftp/Tsg_Ran/WG1_RL1/TSGR1_83/Docs/ [Retrieved on Nov. 24, 2015].

NTT DOCOMO: "Summary on Open Issues Regarding CSI for eMTC", 3GPP Draft, R1-161268, Summary on CSI for eMTC_V2, 3rd Generation Partnership Project (3gpp), Mobile Competence Centre, 650, Route Des Lucioles, F-06921, Sophia-Antipolis, Cedex, France, vol. RAN WG 1, No. St Julian's, Malta, Feb. 15, 2016-Feb. 19, 2016, Feb. 24, 2016 (Feb. 24, 2016 ), XP051 079198, Retrieved from the Internet: URL: http://www.3gpp.org/ftp/tsg_ran/WG1_RL1/TSGR1_84/Docs/ [retrieved on Feb. 24, 2016].

Panasonic: "CSI Report/Measurement in eMTC", 3GPP Draft, R1-156953, 3rd Generation Partnership Project (3GPP), Mobile Competence Centre, 650, Route Des Lucioles, F-06921 Sophia-Antipolis, Cedex, France vol. Ran Wg1, No. Anaheim, USA, Nov. 15, 2015-Nov. 22, 2015, Nov. 15, 2015 (Nov. 15, 2015), XP051039971, Retrieved from the Internet: URL: http://www.3gpp.org/ftp/Meetings_3GPP_SYNC/RAN1/Docs/ [retrieved on Nov. 15, 2015].

Qualcomm Incorporated: Clarifcation on CSI Measurement with Respect to R_CSI, MAX, 3GPP Draft, R1-163007, Clarification on CSI Measurement with Respect to R_CSI, MAX, 3rd Generation Partnership Project (3gpp), Mobile Competence Centre, 650, Route Des Lucioles, F-06921, Sophia-Antipol, vol. RAN WG1, No. Busan, Korea, Apr. 11, 2016-Apr. 15, 2016, Apr. 2, 2016 (Apr. 2, 2016), XP051080461, Retrieved from the Internet: URL: http://www.3gpp.org/ftp/tsg_ran/WG1_RL1/TSGR1_84b/Docs/ [retrieved on Apr. 2, 2016].

Qualcomm Incorporated: "Clarification on CSI Measurements", 3GPP Draft, R1-164399, Clarification on CSI Measurements, 3rd Generation Partnership Project (3gpp), Mobile Competence Centre, 650, Route Des Lucioles, F-06921 Sophia-Antipolis, Cedex, France, vol. RAN WG1, No. Nanjing, China, May 23, 2016-May 27, 2016, May 14, 2016 (May 14, 2016), XP051 089991, Retrieved from the Internet: URL: http://www.3gpp.org/ftp/tsg_ran/WG1_RL1/TSGR1_85/Docs/ [retrieved on May 14, 2016].

Rapporteur W., (Ericsson): "Ran1 Agreements for Rel-13 eMTC Sorted and Edited by Topic", 3gpp Draft, R1-161546, Ran1 Agreements for Rel-13 eMTC Sorted by Topic with Spec Impacts—with Change Tracking, 3rd Generation Partnership Project (3gpp), Mobile Competence Centre, 650, Route Des Luc, vol. RAN WG1, No. St Julian's, Malta, Feb. 15, 2016-Feb. 19, 2016, Feb. 24, 2016 (Feb. 24, 2016), XP051079451, Retrieved from the Internet: URL:http://www.3gpp.org/ftp/tsg_ran/WG1_RL1/TSGR 1_84/Docs/ [retrieved on Feb. 24, 2016].

\* cited by examiner

PERFORMING A CHANNEL STATE INFORMATION MEASUREMENT IN AN ENHANCED MACHINE-TYPE COMMUNICATION

CROSS-REFERENCE TO RELATED APPLICATION(S)

This application claims the benefit of U.S. Provisional Application Ser. No. 62/317,338, entitled "PERFORMING A CHANNEL STATE INFORMATION MEASUREMENT IN AN ENHANCED MACHINE-TYPE COMMUNICATION" and filed on Apr. 1, 2016, which is expressly incorporated by reference herein in its entirety.

BACKGROUND

Field

The present disclosure relates generally to communication systems, and more particularly, to performing a channel state information (CSI) measurement in an enhanced machine-type communication (eMTC) or a narrowband (NB) internet-of-things (NB-IoT) communication.

Background

Wireless communication systems are widely deployed to provide various telecommunication services such as telephony, video, data, messaging, and broadcasts. Typical wireless communication systems may employ multiple access technologies capable of supporting communication with multiple users by sharing available system resources. Examples of such multiple access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In wireless communications, CSI may refer to known channel properties of a communication link between a user equipment (UE) and an evolved Node B (eNB). CSI may indicate how a signal (e.g., transmission) propagates from the eNB to the UE, and may represent the combined effect of, for example, scattering, fading, and power decay with distance. A UE not communicating via eMTC or NB-IoT may be able to measure CSI using a single subframe in a transmission from the eNB. A CSI measurement may be reported back to the eNB, and the eNB may use the CSI report to adapt transmissions to current channel conditions, which may help achieve reliable communication with high data rates in multiple access networks Due to the low signal-to-noise ratio (SNR) associated with eMTC and/or NB-IoT, a UE may not be able to perform a CSI measurement using a single subframe. Thus, there is an unmet need for performing CSI measurements in eMTC and/or NB-IoT regardless of a low SNR.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Due to the low SNR associated with eMTC and/or NB-IoT, a UE communicating with eMTC and/or NB-IoT may not be able to perform a CSI measurement using a single subframe, as compared to regular UEs.

In order to solve this problem, the present disclosure proposes indicating to the UE a set of CSI reference subframes that may be used in performing a CSI measurement. The set of CSI reference subframes may be measured over multiple frequencies when frequency hopping occurs. In addition, the UE may omit certain CSI reference subframes (e.g., subframes that are too old) from the CSI measurement in order to provide an up to date CSI report.

In an aspect of the disclosure, a method, a computer-readable medium, and an apparatus are provided. The apparatus may receive information associated with a number of CSI reference subframes to use in performing CSI measurements in a narrowband communication. In addition, the apparatus may monitor subframes on at least two frequency channels. In an aspect, each of the at least two frequency channels may include a physical downlink control channel (PDCCH). Further, the apparatus may perform a CSI measurement across the at least two frequency channels based on the information associated with the number of CSI reference subframes.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
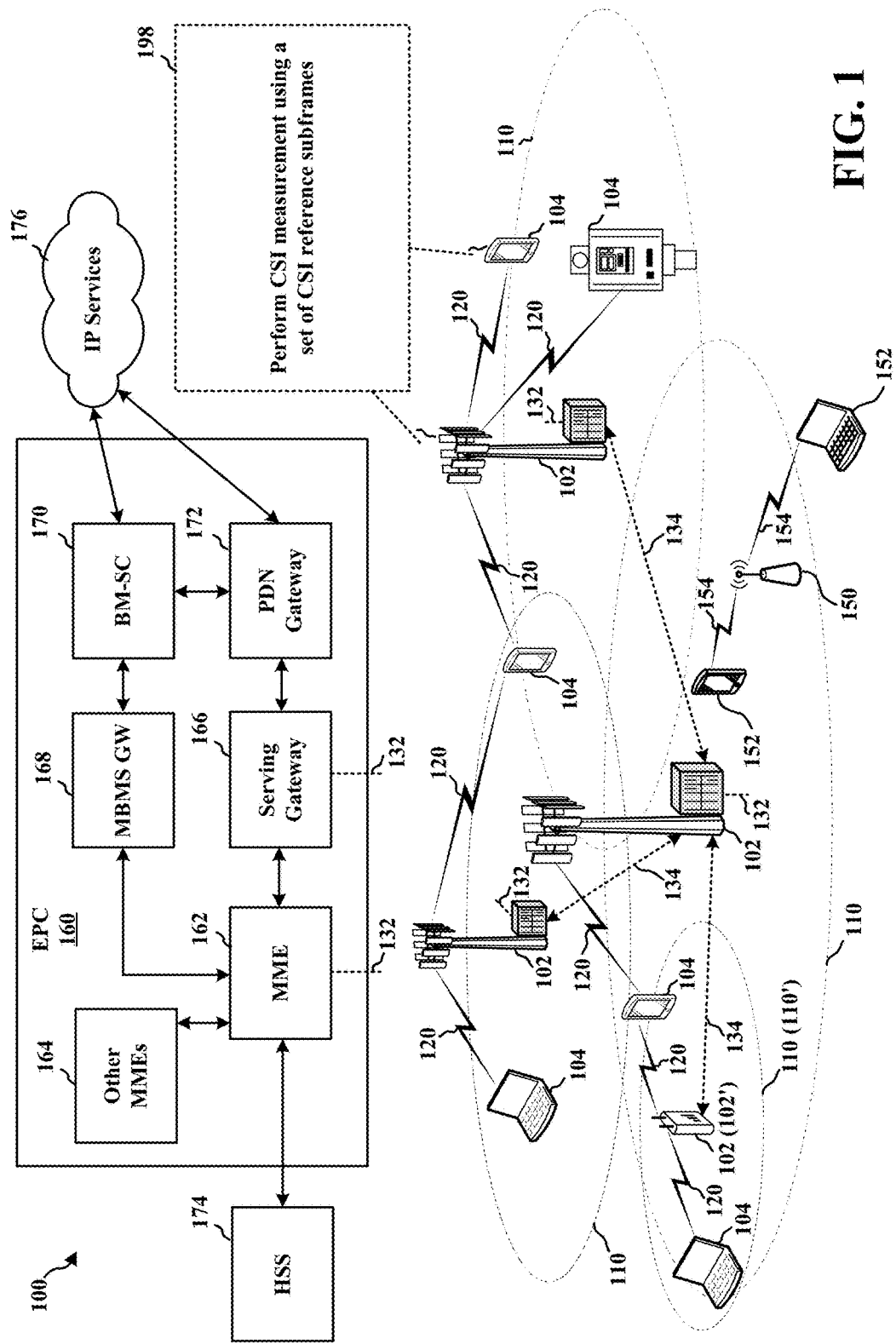
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, an eMTC device or NB-IoT device (e.g., a parking meter) or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to perform CSI measurement using a set of CSI reference subframes (198).

Figures 2A, 2B, 2C, 2D:
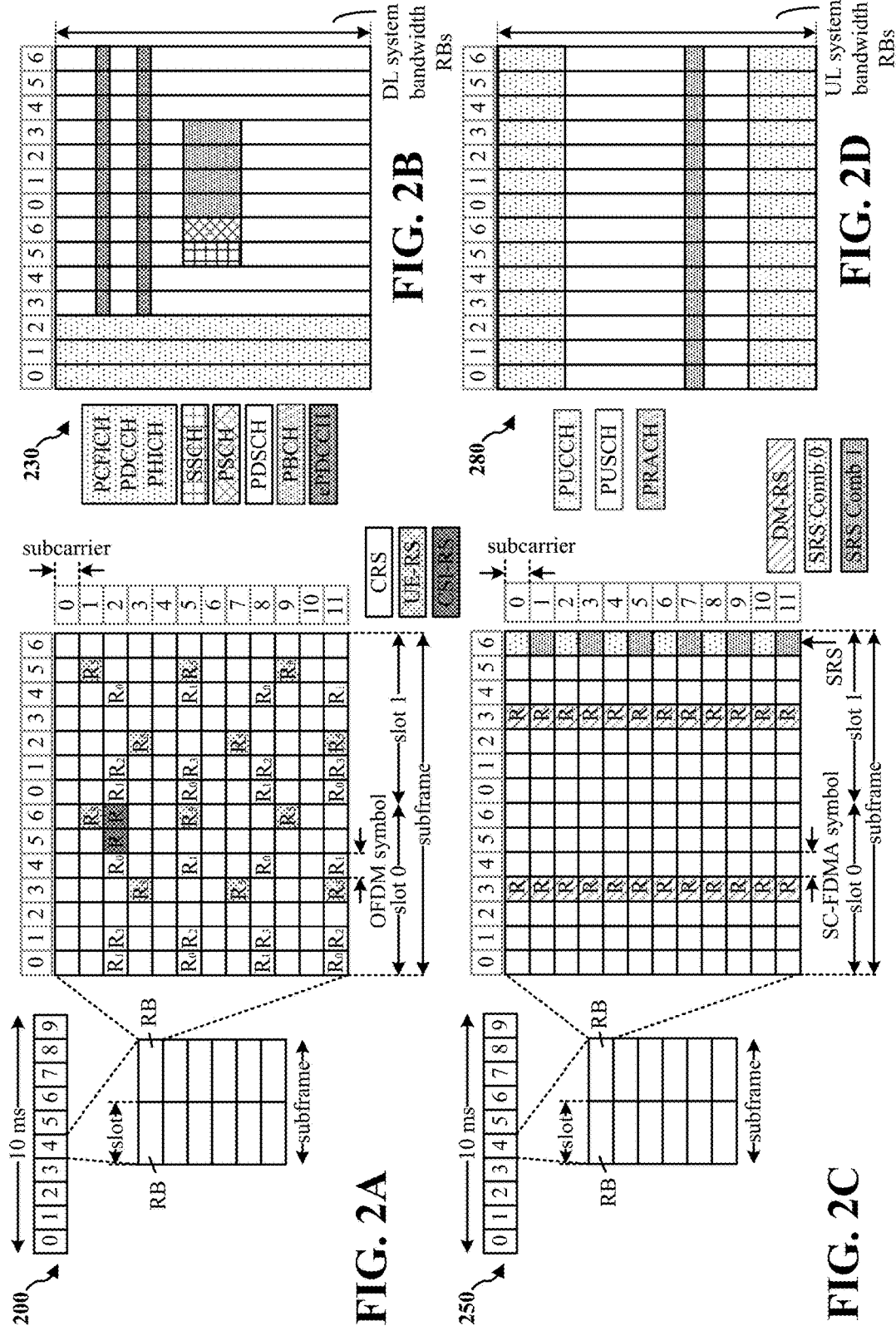
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the PDCCH occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK)

feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
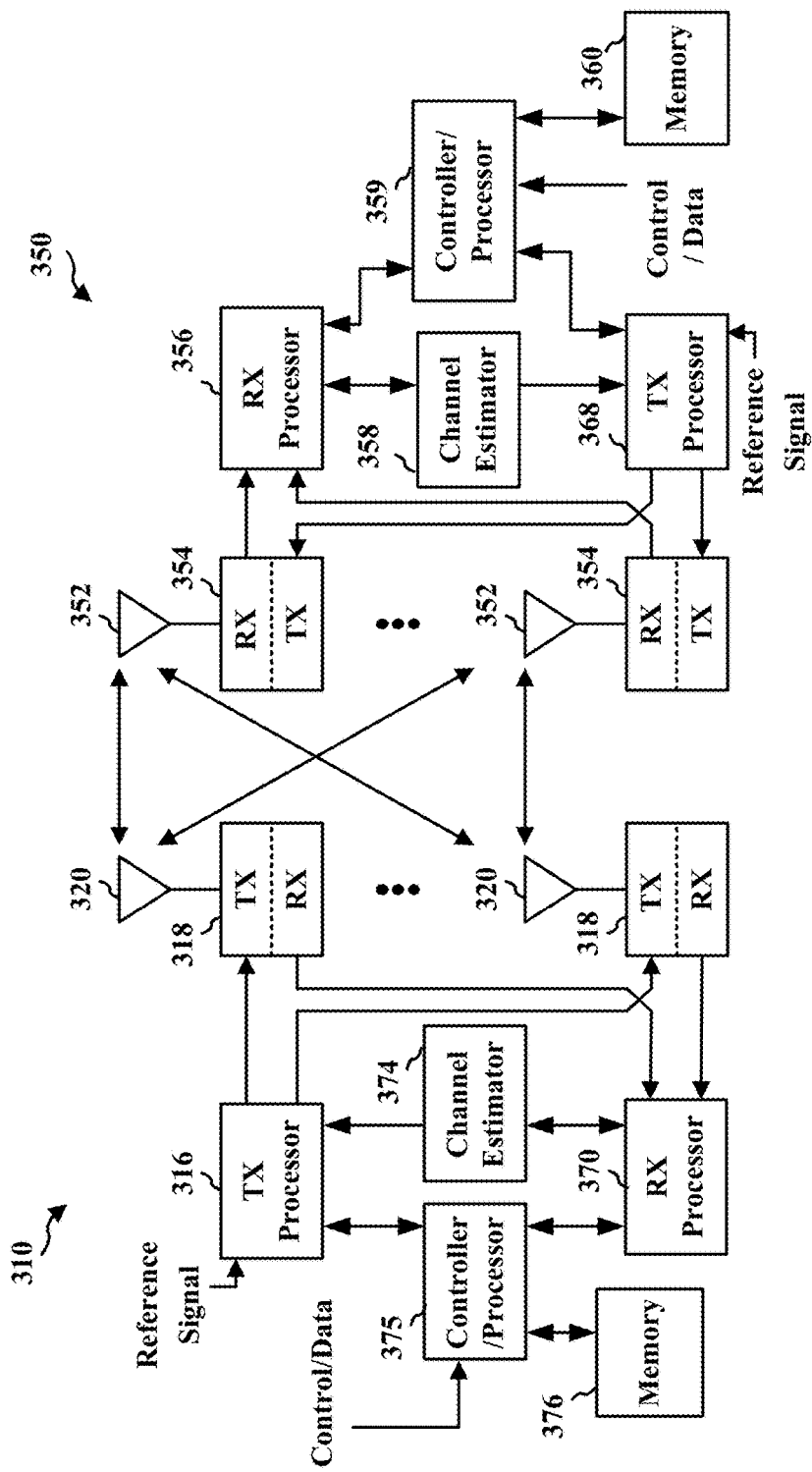
FIG. 3 is a diagram illustrating an example of an eNB and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In wireless communications, CSI may refer to known channel properties of a communication link between a UE and an eNB. CSI may indicate how a signal (e.g., transmission) propagates from the eNB to the UE, and may represent the combined effect of, for example, scattering, fading, and power decay with distance. A UE not communicating via eMTC may be able to measure CSI using a single subframe in a transmission from the eNB. A CSI measurement may reported back to the eNB, and the eNB may use the CSI report to adapt transmissions to current channel conditions, which may help achieve reliable communication with high data rates in multiantenna systems.

Due to the low SNR associated with eMTC, a UE communicating with eMTC may not be able to perform a CSI measurement using a single subframe.

In order to solve this problem, the present disclosure proposes indicating to the UE a set of CSI reference subframes that may be used in performing a CSI measurement. The set of CSI reference subframes may be measured over multiple frequencies when frequency hopping occurs. In addition, the UE may omit certain CSI reference subframes (e.g., subframes that are too old) from the CSI measurement to provide an up to date CSI report.

Figure 4:
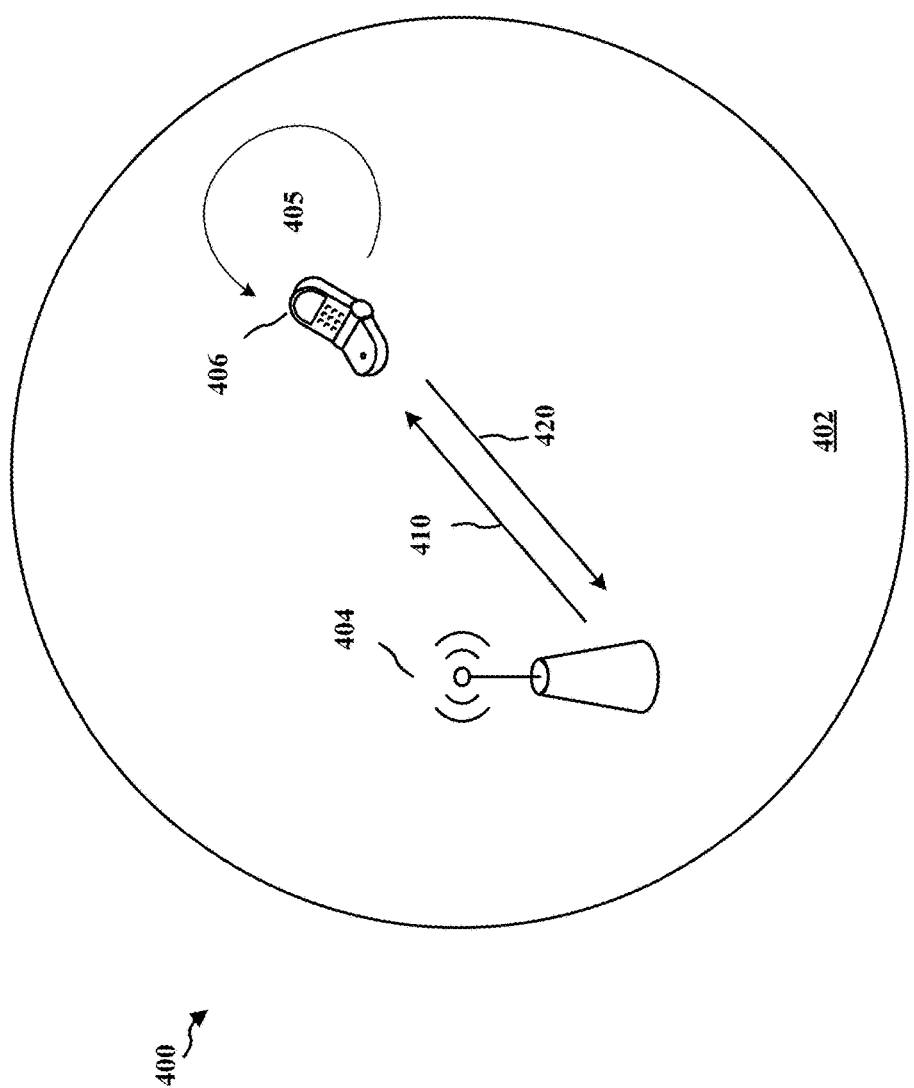
FIG. 4 is a diagram of a communications system in accordance with an aspect of the present disclosure.

FIG. 4 is a diagram of an eMTC communications system 400. The eMTC communications system 400 may include an eNB 404 in communication with a UE 406 located in cellular region 402. Coverage enhancements of eMTC devices (e.g., UE 406) may be employed to provide more reliable communications within eMTC communications system 400. Coverage enhancements may include, among others, frequency hopping. For example, UE 406 may perform frequency hopping by monitoring, receiving, and/or transmitting signals by switching a carrier among different frequency channels (e.g., narrowband channels) to exploit the frequency diversity of the wideband channel used in multiple access technologies to provide coverage enhancement. In addition, to perform a CSI measurement, UE 406 may use a set of CSI reference subframes across different frequency channels when frequency hopping occurs.

In one aspect, the eNB 404 may transmit information 410 associated with a preferred number of CSI reference subframes for the UE 406 to use in performing CSI measurements for eMTC with the eNB 404. For example, the information 410 associated with the preferred number of CSI reference subframes may be indicated as R_CSIMax and/or $R^{CQI}$. In an aspect, the UE 406 may monitor a set of subframes 405 on at least one frequency channel on which a PDCCH is received from the eNB 404. In another aspect, the UE 406 may use at least a portion of the set of subframes as CSI reference subframes to perform a CSI measurement 405. The CSI measurements may be transmitted in a CSI report 420 to the eNB 404.

In a first example embodiment, the number of subframes used by the UE 406 as the CSI reference subframes may be less than the preferred number of CSI reference subframes. In the first example embodiment, the UE 406 may perform the CSI measurement by applying a scaling factor to the CSI measurement. The scaling factor may be proportional to the preferred number of CSI reference subframes. For example, the R_CSIMax may be taken as a scaling value for the spectral efficiency estimation when the number of subframes used to perform the CSI measurement is less than R_CSIMax. Here, there may be no mapping of CSI reference resources to a set of subframes. In addition, determining how to deal with outdated CSI measurements may be left to UE implementation. Additionally and/or alternatively, the UE 406 may perform the CSI measurement by calculating an average spectral efficiency 405 and applying a scaling factor to the average spectral efficiency. For example, the average spectral efficiency may include at least one of a weighted average, an exponential average, or another type of average.

In a second example embodiment, the set of subframes on which a PDCCH is received may include a set of subframes on a first frequency band and a set of subframes on a second frequency band. In the second example embodiment, the UE 406 may perform the CSI measurement by performing a CSI measurement using at least a portion of the set of subframes on the first frequency band as the CSI reference subframes but not a portion of the set of subframes on the second frequency band. Additional details of the second example embodiment are discussed infra with respect to FIG. 5.

Figure 5:
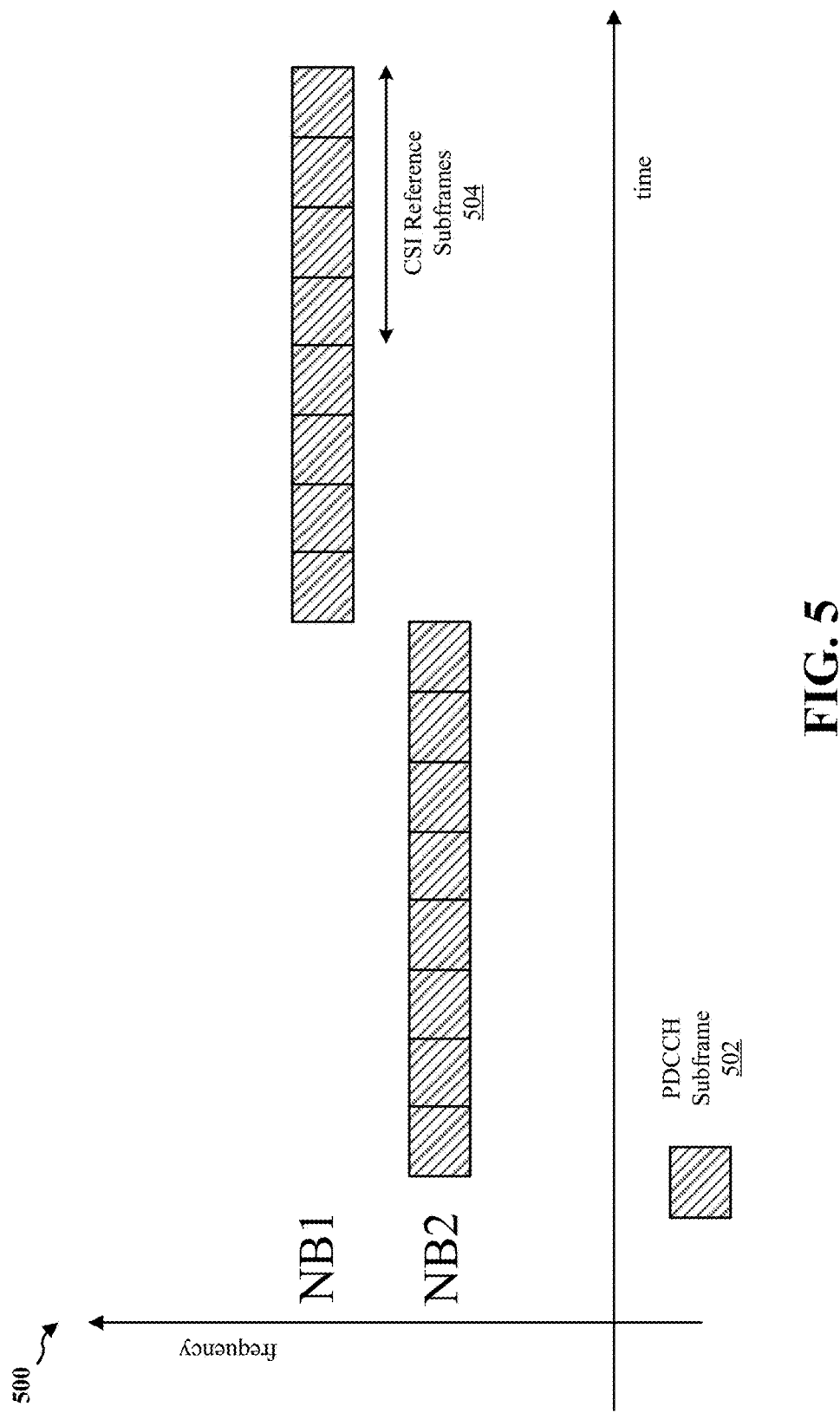
FIG. 5 is a diagram of CSI reference subframes in accordance with a first aspect of the present disclosure.

FIG. 5 is a diagram 500 illustrating NB frequency hopping in which subframes from a single NB frequency are used in performing a CSI frequency measurement. NB wireless communication involves communicating with a limited frequency dimension. One example of NB wireless communication is NB-IoT, which is limited to a single RB of system bandwidth, e.g., 200 Hz. Another example of NB wireless communication is eMTC, which is limited to six RBs of system bandwidth.

FIG. 5 illustrates PDCCH subframes 502 on two different NB frequencies (e.g., NB1 and NB2). Here the UE 406 may frequency hop between NB1 and NB2 to monitor for the PDCCH. In the case of frequency hopping, there may a scenario in which one or more of the frequencies are not observed during the CSI reference period (e.g., NB2 is not observed). Thus, the UE 406 may perform the CSI measurement using a portion of the set of subframes on NB1 as the CSI reference subframes 504 but not on NB2. In the example illustrated in FIG. 5, the last R_CSIMax (e.g., R_CSIMax=4) observed in NB1 is used as the CSI reference subframes 504.

Referring again to FIG. 4, in a third example embodiment, the set of subframes on which a PDCCH is received may include a set of subframes on a first frequency band and a set of subframes on a second frequency band. In this third example embodiment, the UE 406 may perform the CSI measurement using at least a portion of the set of subframes on the first frequency band and a portion of the set of subframes on the second frequency band as the CSI reference subframes. Additional details of the third example embodiment are discussed infra with respect to FIG. 6.

Figure 6:
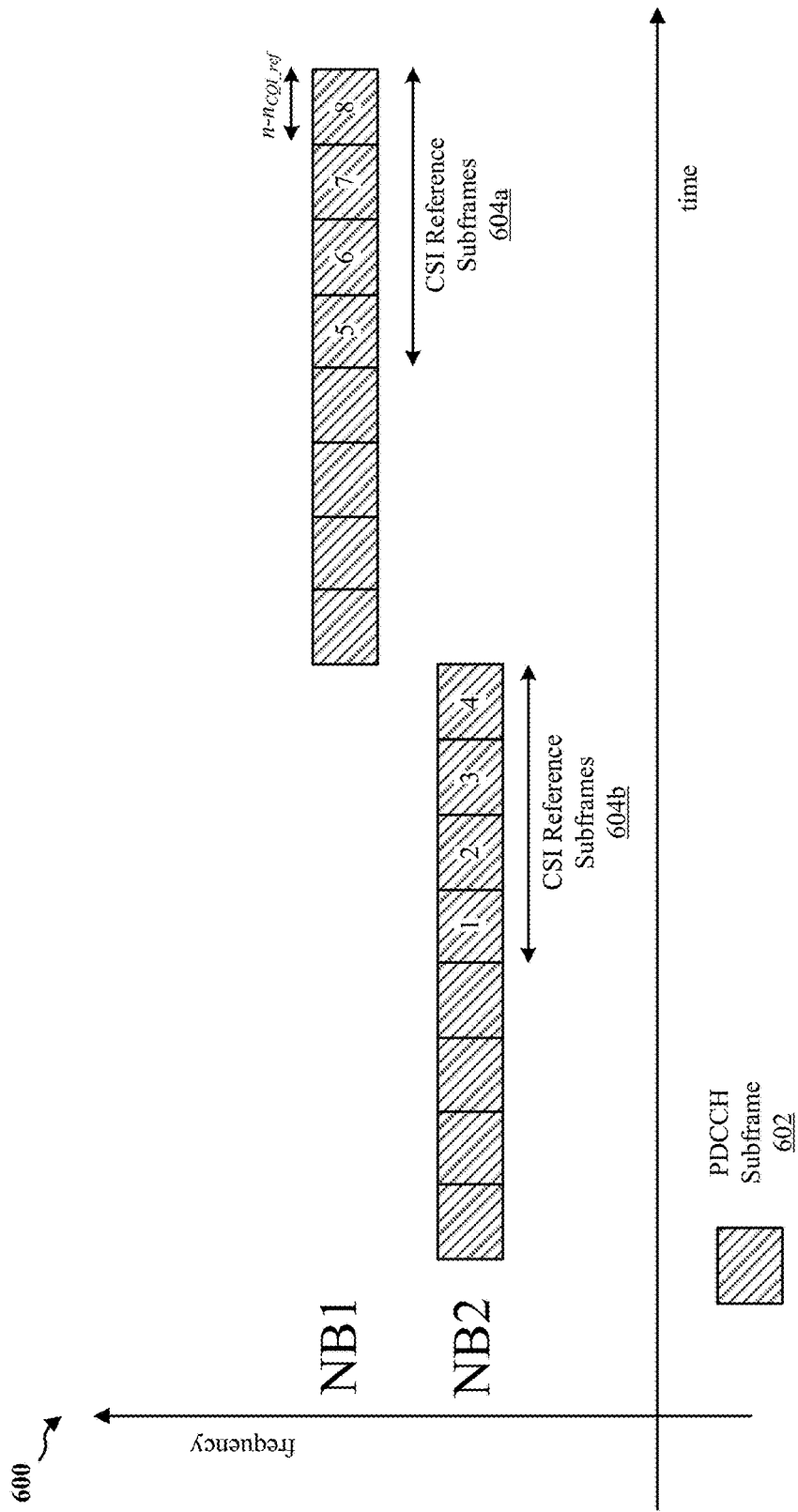
FIG. 6 is a diagram of CSI reference subframes in accordance with a second aspect of the present disclosure.

FIG. 6 is a diagram 600 illustrating NB frequency hopping in which subframes from two NB frequencies are used in performing a CSI frequency measurement. FIG. 6 illustrates PDCCH subframes 602 on two different frequencies (e.g., NB1 and NB2). Here the UE 406 may frequency hop between NB1 and NB2 to monitor for the PDCCH. In the case of frequency hopping, there may be an instance in which multiple frequencies are observed during the CSI reference period (e.g., both NB1 and NB2 are observed). Thus, the UE 406 may perform the CSI measurement using a portion of the subframes on NB1 and a portion of the subframes 604b on NB2 as the CSI reference subframes. In the example illustrated in FIG. 6, the last R_CSIMax (e.g., R_CSIMax=4) observed in each of NB1 and NB2 may be used as the CSI reference subframes 604a, 640b. In other words, the UE 406 may measure the CSI using four subframes in each of NB1 and NB2.

For example, the UE 406 may perform the CSI measurement across NB1 and NB2 by determining a first set of CSI reference subframes 604a on NB1 and determining a second set of CSI reference subframes 604b on NB2. In other words, the CSI measurement may be performed using the first set of CSI reference subframes 604a and the second set of CSI reference subframes 604b.

In an aspect, each subframe in the CSI reference subframes 604a, 604b may be a downlink subframe or a special subframe where the first subframe measured by the UE 406 is subframe n and the last subframe measured by the UE 406 is subframe $n-n_{CQI\_ref}$. For periodic and/or aperiodic CSI reporting, $n_{CQI\_ref}$ may be greater than or equal to 4.

In a further aspect, the first set of CSI reference subframes 604a and the second set of CSI reference subframes 604b may each include N reference subframes. For example, N may be equal to the number of the last CSI reference subframes ($R^{CSI}$) measured before subframe $n-n_{CQI\_ref}$ on each of NB1 and NB2.

In such a case, the UE 406 may perform spectral efficiency (SE) averaging across the CSI reference subframes 604a, 604b in the subframe set (e.g., subframes 1-8). In other words, the UE 406 may perform the CSI measurement by averaging the SE across the CSI reference subframes 604a, 604b in each of the narrowbands. For example, the wideband CSI measurement may be based on the eight observed subframes, with a normalization to compensate the increased number of subframes as seen below in equation 1.

$$SE_w = \frac{1}{2}(SE_1 + SE_2 + SE_3 + SE_4 + SE_5 + SE_6 + SE_7 + SE_8) \quad (1)$$

While the narrowband CQI measurement may be determined using equations 2 and 3 below.

$$SE_{NB1} = (SE_5 + SE_6 + SE_7 + SE_8) \quad (2)$$

$$SE_{NB2} = (SE_1 + SE_2 + SE_3 + SE_4) \quad (3)$$

Referring again to FIG. 4, in a fourth example embodiment, the UE 406 may not perform the CSI measurement using an MBSFN subframe or a discontinuous reception (DRX) subframe because MBSFN subframes and DRX subframes may not include a CRS that is used by the UE 406 in performing the CSI measurement. Thus, the UE 406 may exclude any MBSFN subframes and/or DRX subframes from the CSI reference subframes. Additional details of the fourth example embodiment are discussed infra with respect to FIGS. 7A and 7B.

Figure 7A:
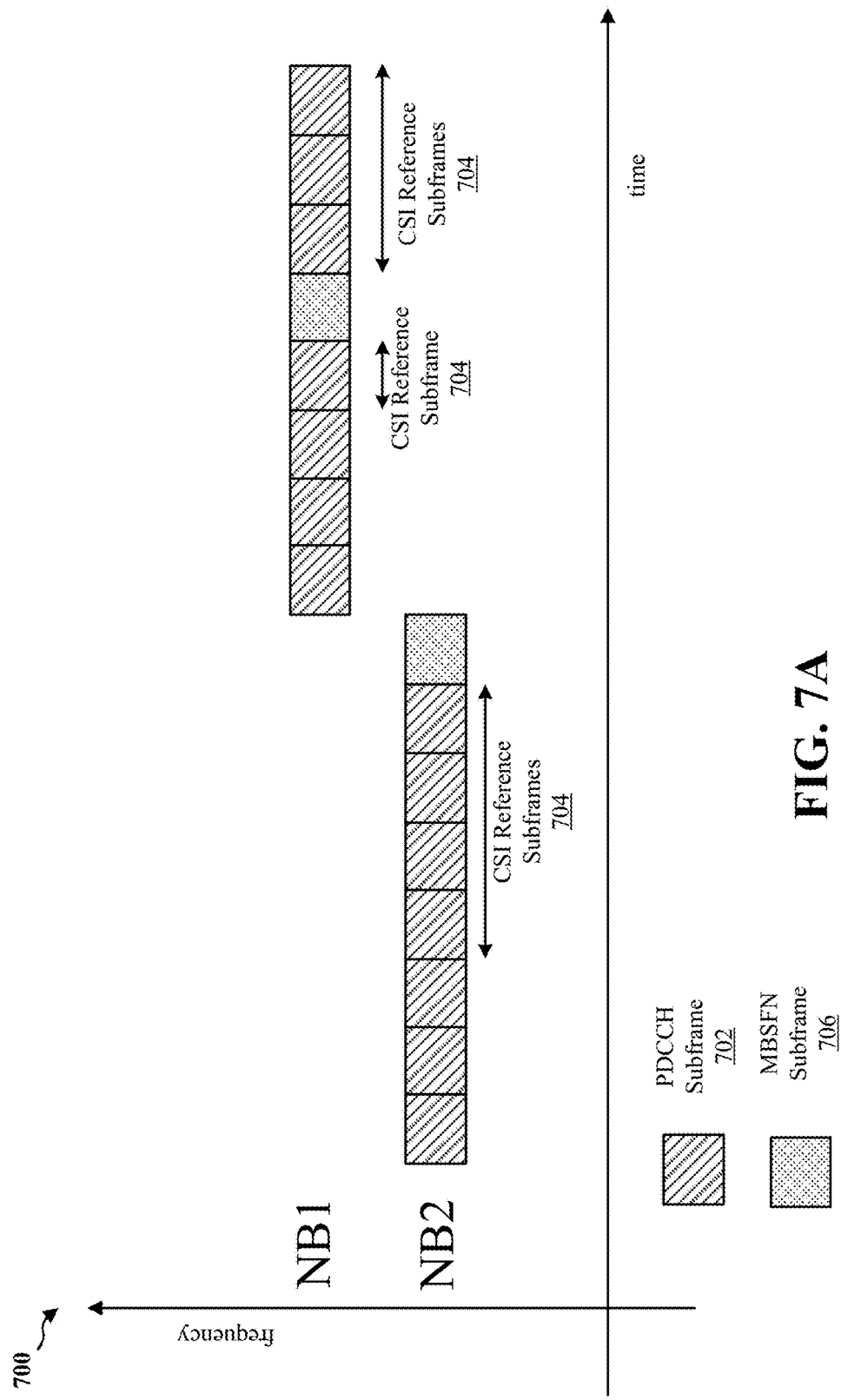
FIGS. 7A and 7B are diagrams of CSI reference subframes in accordance with a third aspect of the present disclosure.

FIG. 7A is a diagram 700 illustrating NB frequency hopping in which subframes from two NB frequencies are used in performing a CSI frequency measurement. FIG. 7A illustrates PDCCH subframes 702 on two different frequencies (e.g., NB1 and NB2). In addition, each of the NB1 and NB2 includes an MBSFN subframe 706. Here, the UE 406 may frequency hop between NB1 and NB2 to monitor for the PDCCH. Furthermore, the UE 406 may perform the CSI measurement using both a portion of the set of subframes on NB1 and a portion of the set of subframes on NB2 as the CSI reference subframes 704. However, the UE 406 may not use the MBSFN subframes 706 in performing the CSI measurement for the reasons described above.

In the example illustrated in FIG. 7A, the UE 406 may perform the CSI measurement using the last R_CSIMax (e.g., R_CSIMax=4) observed in each NB1 and NB2 that do not include the MBSFN subframe 706. For example, with respect to NB1, R_CSIMax includes the last three subframes 702 and the fifth to last subframe 702 (e.g., omitting the fourth to last subframe that is an MBSFN subframe 706). With respect to NB2, R_CSIMax includes a set of four subframes 702 adjacent to the last subframe (e.g., omitting the last subframe that is an MBSFN subframe 706).

Figure 7B:
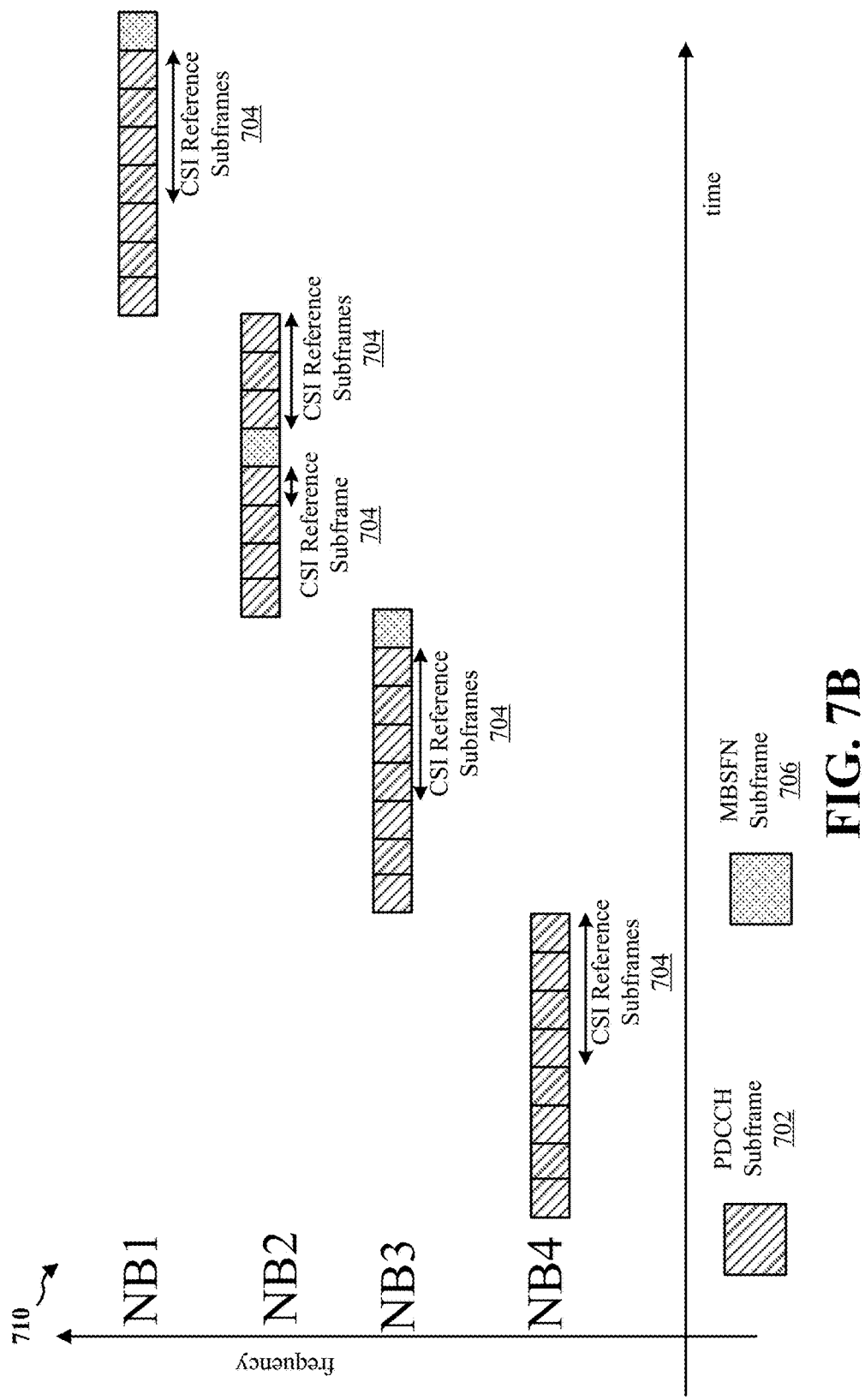

FIG. 7B is a diagram 710 illustrating NB frequency hopping in which subframes from four NB frequencies are used in performing a CSI frequency measurement. FIG. 7B illustrates PDCCH subframes 702 received on four different frequencies (e.g., NB1, NB2, NB3, and NB4). In addition, each of NB1, NB2, and NB3 includes an MBSFN subframe 706. Here, the UE 406 may frequency hop between NB1, NB2, NB3, and NB4 to monitor for the PDCCH. Furthermore, the UE 406 may perform the CSI measurement using a portion of the set of subframes on NB1, a portion of the set of subframes on NB2, a portion of the set of subframes on NB3, and a portion of the set of subframes on NB4 as the CSI reference subframes 704. However, the UE 406 may not use the MBSFN subframes 706 in performing the CSI measurement.

In the example illustrated in FIG. 7B, the UE 704 may perform the CSI measurement using the last R_CSIMax (e.g., R_CSIMax=4) observed in each of NB1, NB2, and NB3 that do not include the MBSFN subframe 706. For example, with respect to NB1, R_CSIMax includes a set of four subframes 702 adjacent to the last subframe (e.g., omitting the last subframe that is an MBSFN subframe 706). With respect to NB2, R_CSIMax includes the last three subframes 702 and the fifth to last subframe 702 (e.g., omitting the fourth to last subframe that is an MBSFN subframe 706). With respect to NB3, R_CSIMax includes a set of four subframes 702 adjacent to the last subframe (e.g., omitting the last subframe that is an MBSFN subframe 706). With respect to NB3, R_CSIMax includes a set of four subframes 702 adjacent to the last subframe (e.g., omitting the last subframe that is an MBSFN subframe 706). With respect to NB4, R_CSIMax includes the last four subframes 702 since there is no MBSFN subframe 706 in NB4.

Referring again to FIG. 4, in a fifth example embodiment, the UE 406 may monitor a PDSCH received in one of the first frequency channel or the second frequency channel. Here, the UE 406 may perform the CSI measurement 405 using at least a portion of a set of PDSCH subframes as the CSI reference subframes when the PDSCH subframes are received in the same frequency band as the PDCCH subframes.

In a sixth example embodiment, the UE 406 may monitor a PDSCH received in a third frequency band by frequency hopping between a first frequency band in which a the UE 406 monitors for the PDCCH and a second frequency band in which the UE 406 monitors for the PDCCH. Additional details of the sixth example embodiment are discussed infra with respect to FIG. 8.

Figure 8:
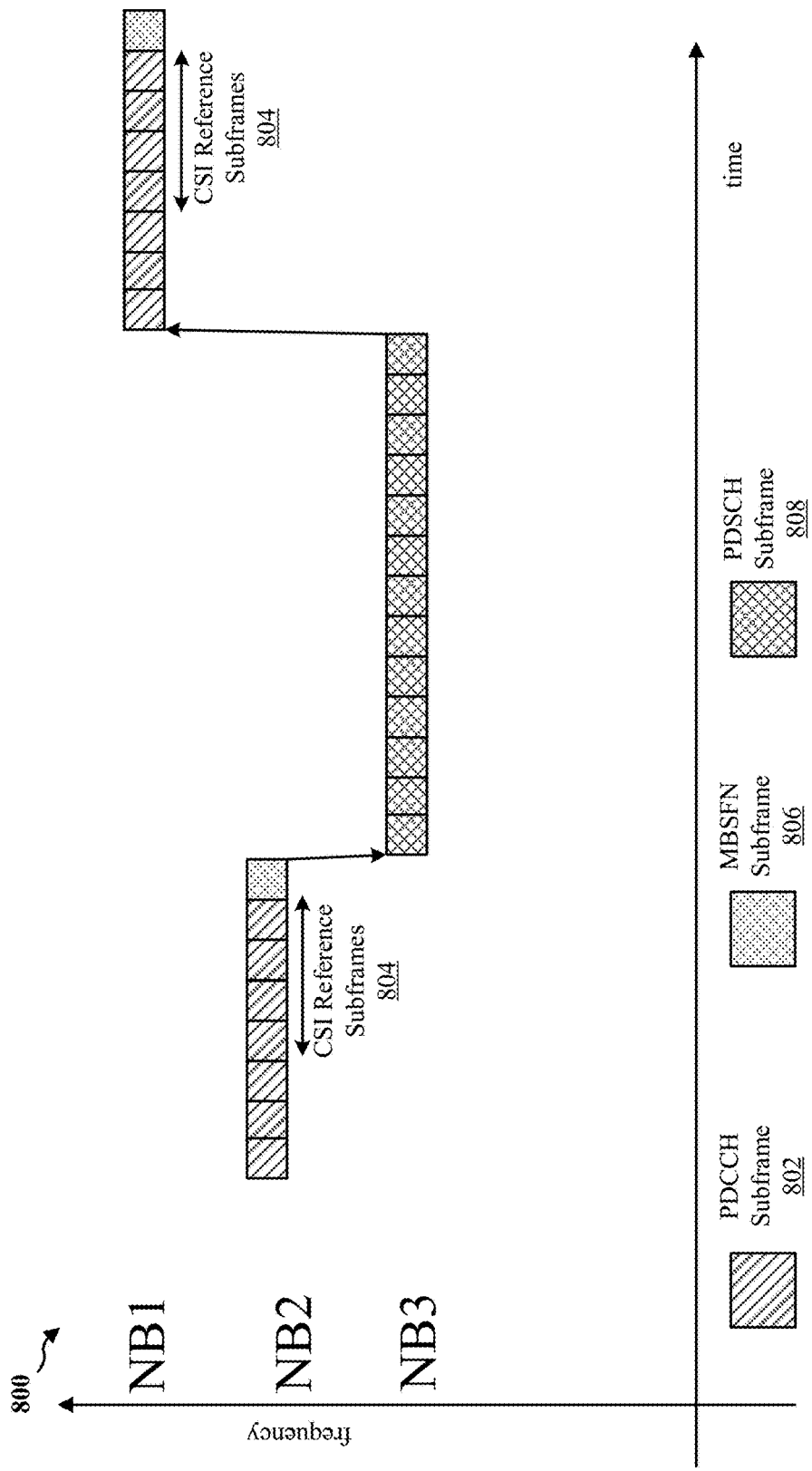
FIG. 8 is a diagram of CSI reference subframes in accordance with a fourth aspect of the present disclosure.

FIG. 8 is a diagram 800 illustrating an NB frequency hopping in which subframes from two NB frequencies are used in performing a CSI frequency measurement. FIG. 8 illustrates PDCCH subframes 802 received on two different frequencies (e.g., NB1 and NB2) on which a PDCCH is received. In addition, FIG. 8 illustrates a third frequency (e.g., NB3). Each of NB1 and NB2 includes an MBSFN subframe 806. Here, the UE 406 may frequency hop between to monitor for the PDSCH and the PDCCH. Furthermore, the UE 406 may perform the CSI measurement using both a portion of the set of subframes on NB1 and a portion of the set of subframes on NB2 as the CSI reference subframes 804. Since the PDSCH subframes 808 are not received in the same NB as the PDCCH subframes 802, the UE 406 may not use the PDSCH subframes 808 to perform the CSI measurement. In addition, the UE 406 may not use the MBSFN subframes 806 in NB1 or NB2 in performing the CSI measurement. In the example illustrated in FIG. 8, the UE 804 may perform the CSI measurement using the last R_CSIMax (e.g., R_CSIMax=4) observed in each NB1 and NB2 that do not include the MBSFN subframe 806. For example, with respect to NB1, R_CSIMax includes a set of four subframes 802 adjacent to the last subframe (e.g., omitting the last subframe that is an MBSFN subframe 806). With respect to NB2, R_CSIMax includes a set of four subframes 802 adjacent to the last subframe (e.g., omitting the last subframe that is an MBSFN subframe 806).

Referring again to FIG. 4, in a seventh example embodiment, the UE 406 may receive information 410 associated with a maximum subframe age of subframes that may be included in the CSI report. For example, the information 410 may be signaled as a new RRC parameter. Alternatively, the information 410 may be based on the maximum number of repetitions for PDCCH or the hopping length. The UE 406 may exclude subframes 405 that exceed the maximum subframe age from the CSI report. Furthermore, the UE 406 may perform the CSI measurement by applying a scaling factor 405 that is proportional to a number of subframes excluded from the CSI report. Additional details of the seventh example embodiment are discussed infra with respect to FIG. 9.

Figure 9:
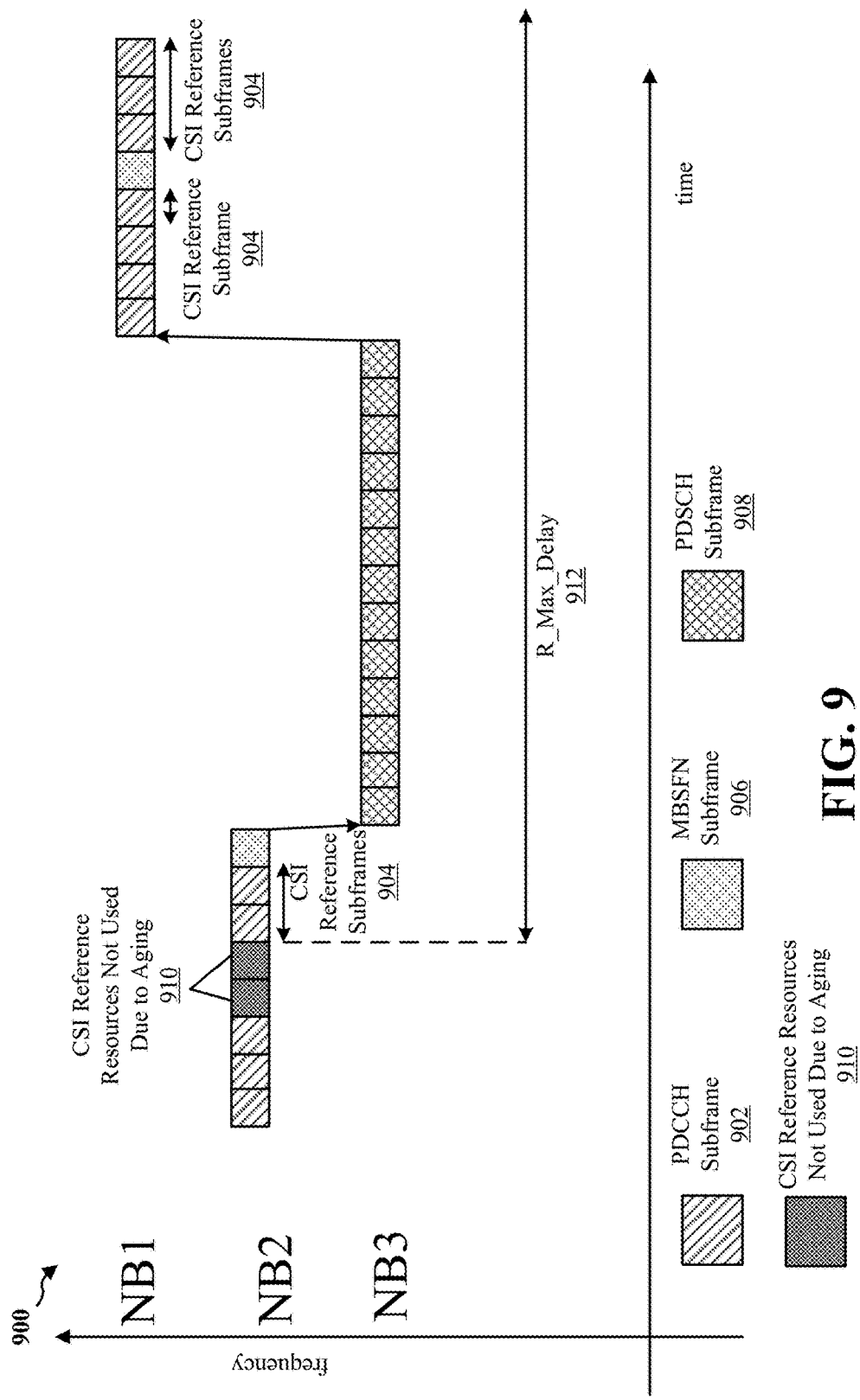
FIG. 9 is a diagram of CSI reference subframes in accordance with a fifth aspect of the present disclosure.

FIG. 9 is a diagram 900 illustrating an NB frequency hopping 900 in which subframes from two NB frequencies are used in performing a CSI frequency measurement. FIG. 9 illustrates PDCCH subframes 902 on two different frequencies (e.g., NB1 and NB2) on which a PDCCH is received by the UE 406. In addition, FIG. 9 illustrates a third frequency (e.g., NB3) on which a PDSCH is received by the UE. Each of NB1 and NB2 includes an MBSFN subframe 906. Here, the UE 406 may frequency hop to monitor for the PDSCH and the PDCCH. Furthermore, the UE 406 may receive information associated with a maximum subframe age (e.g., R_Max_Delay) for subframes that may be included in the CSI report. The UE 406 may perform the CSI measurement using both a portion of the set of subframes on NB1 and a portion of the set of subframes on NB2 as the CSI reference subframes 904. Since the PDSCH subframes 908 are not received in the same NB as the PDCCH subframes 902, the UE 406 may not use the PDSCH subframes 908 to perform the CSI measurement. In addition, the UE 406 may not use the MBSFN subframes 906 in NB1 or NB2 to perform the CSI measurement.

In the example illustrated in FIG. 9, the UE 406 may perform the CSI measurement using the last R_CSIMax (e.g., R_CSIMax=4) observed in each NB1 and NB2 that do not include the MBSFN subframe 906 and are not outdated (e.g., older than R_Max_Delay). For example, with respect to NB1, R_CSIMax includes the last three subframes 902 and the fifth to last subframe 902 (e.g., omitting the last subframe that is an MBSFN subframe 906). With respect to NB2, R_CSIMax includes four subframes 902 adjacent to the last subframe (e.g., omitting the last subframe that is an MBSFN subframe 906). However, since the last two subframes 910 in R_CSIMax are older than R_Max_Delay, the UE 406 omits these two CSI reference subframes from the CSI measurement.

In an eighth example embodiment, the UE 406 may interpret the preferred number of CSI reference subframes in various ways. As discussed supra, FIG. 6 illustrates a first interpretation. As discussed infra, FIG. 10A illustrates a second interpretation and FIG. 10B illustrates a third interpretation.

Figure 10A:
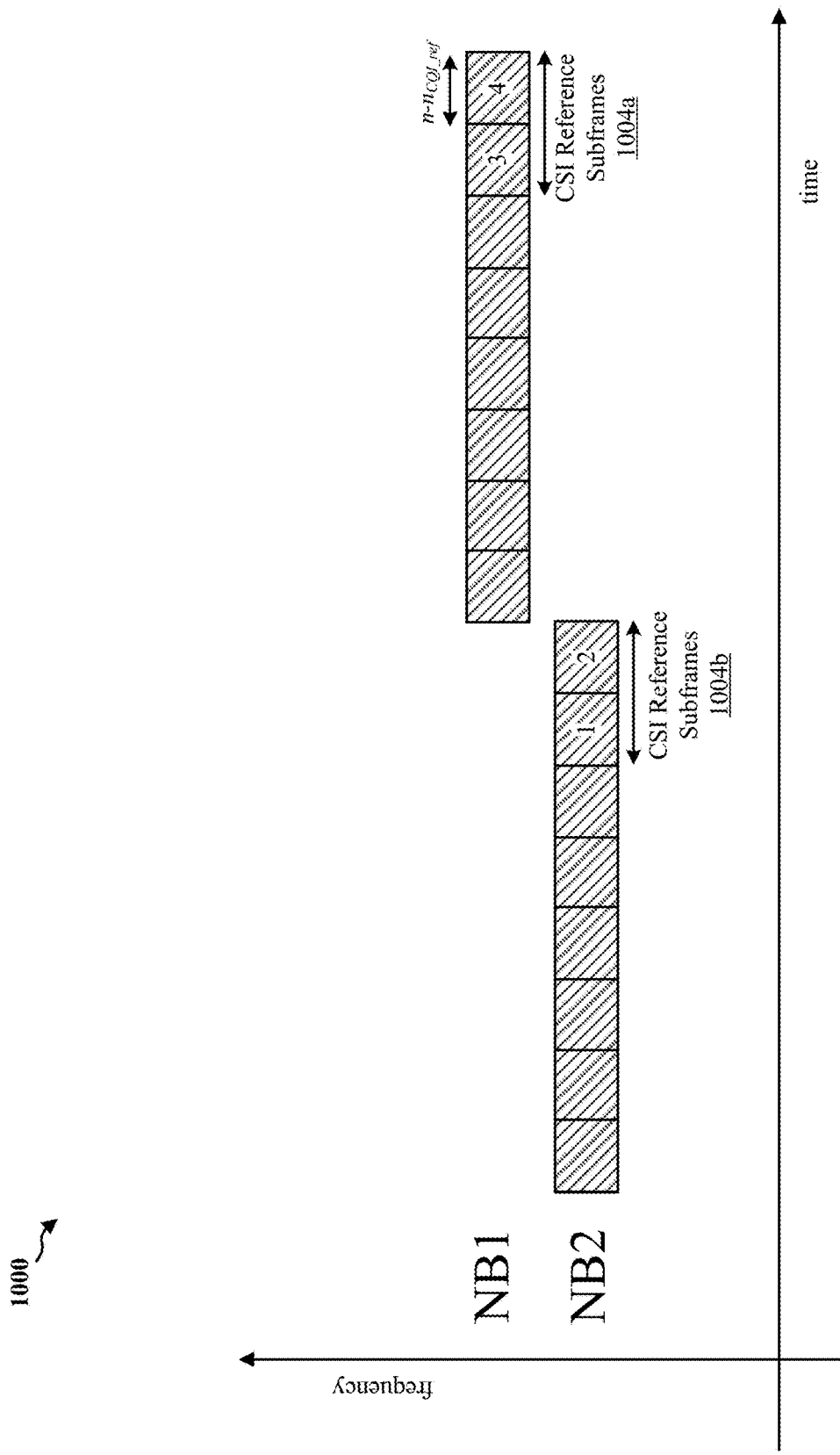
FIGS. 10A and 10B are diagrams of CSI reference subframes in accordance with a sixth aspect of the present disclosure.
Figure 10B:
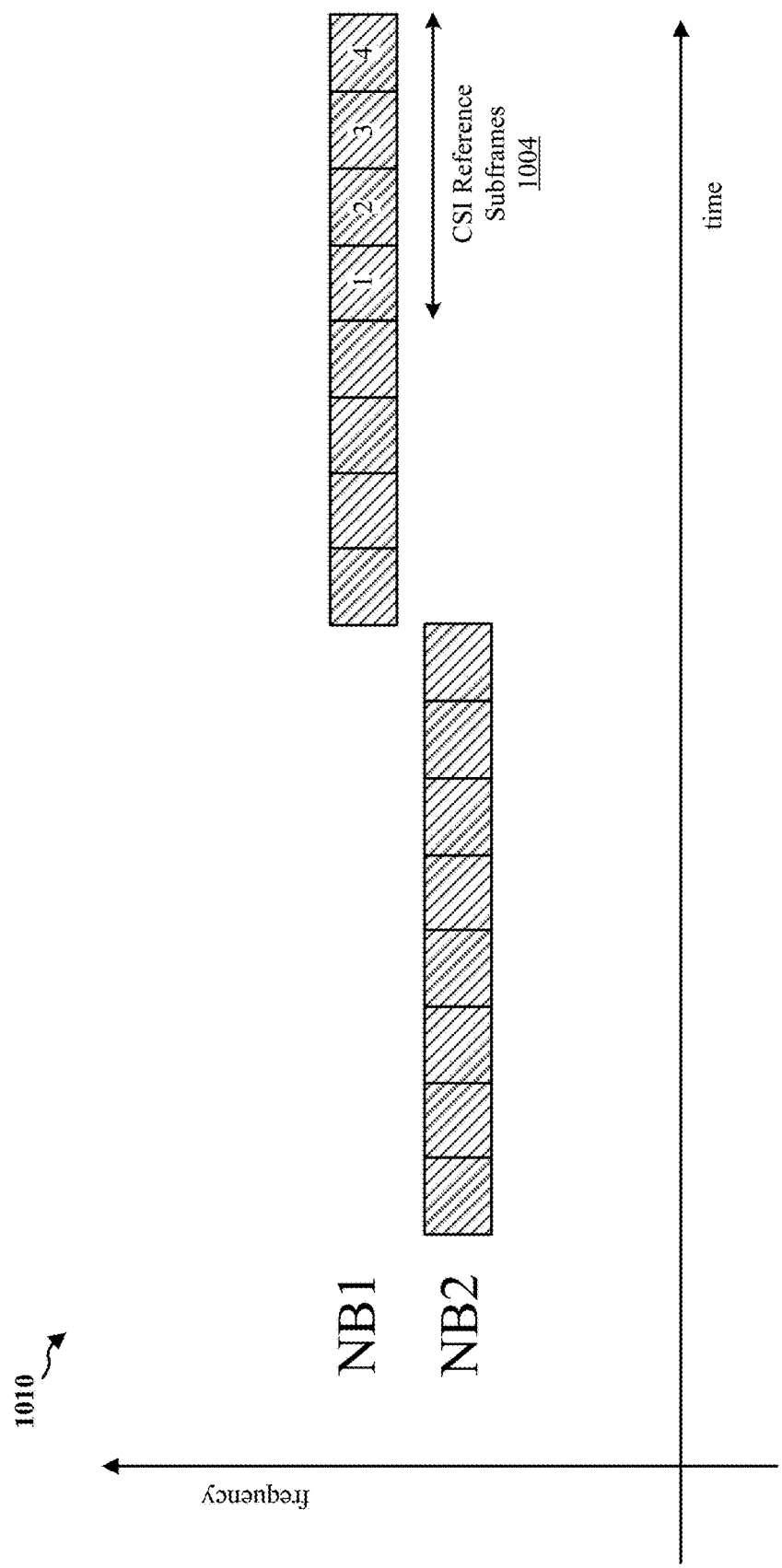

FIG. 10A is a diagram 1000 illustrating an NB frequency hopping in which subframes from two NB frequencies are used in performing a CSI measurement. In FIG. 10A, the preferred number of CSI reference subframes 1004a, 1004b (e.g., R_CSIMax=4) may be interpreted by the UE 406 such that the CSI measurement is performed using a portion of the preferred number of CSI reference subframes from among each a number of narrowbands ($N_{NB,hop}^{ch,DL}$) In the example illustrated in FIG. 10A $N_{NB,hop}^{ch,DL}$ is equal to two. In other words, the UE 406 measures the CSI using subframes across each of NB1 and NB2.

For example, the UE 406 may perform the CSI measurement across NB1 and NB2 by determining a first set of CSI reference subframes 1004a on NB1 and determining a second set of CSI reference subframes 1004b on NB2. In other words, the CSI measurement may be performed using the first set of CSI reference subframes 1004a and the second set of CSI reference subframes 1004b.

In an aspect, each subframe in the CSI reference subframes 1004a, 1004b may be a downlink subframe or a special subframe where the first subframe measured by the UE 406 is subframe n and the last subframe measured by the UE 406 is subframe $n-n_{CQI\_ref}$. For periodic and/or aperiodic CSI reporting $n_{CQI\_ref}$ may be greater than or equal to 4.

In a further aspect, the first set of CSI reference subframes 1004a and the second set of CSI reference subframes 1004b each comprise M reference subframes. For example, M may be equal to the number of the last CSI reference subframes ($R^{CSI}$) measured before subframe $n-n_{CQI\_ref}$ divided by the number of narrowbands ($N_{NB,hop}^{ch,DL}$) on which the UE 406 monitors the PDCCH. In addition, the UE 406 may transmit 420 a wideband CSI report associated with the CSI measurement taken across NB1 and NB2.

In the example illustrated in FIG. 10A, R_CSIMax may be split between NB1 and NB2. For example, since there are 2 narrowbands and R_CSIMax=4, then each narrowband may have two subframes each that are used for measuring CSI. Here, the CQI measurement for wideband may be obtained as seen below using equation 4.

$$SE_w = SE_1 + SE_2 + SE_3 + SE_4 \quad (4)$$

The two CSI measurements for narrowband may be scaled to meet the reference of four repetitions for PDSCH as seen below in equations 5 and 6.

$$SE_{NB1} = 2(SE_3 + SE_4) \quad (5)$$

$$SE_{NB2} = 2(SE_1 + SE_2) \quad (6)$$

FIG. 10B is a diagram 1010 illustrating an NB frequency hopping in which subframes from two NB frequencies may be used in performing a CSI frequency measurement. In FIG. 10B, the preferred number of CSI reference subframes 1004 (e.g., R_CSIMax=4) is interpreted by the UE 406 such that the CSI measurement is performed using the preferred number of CSI reference subframes in NB1 but not in NB2 (e.g., wherein the measurement is performed using the last valid subframes corresponding to the preferred number of subframes). In other words, the UE 406 measures the CSI using four subframes in NB1 and does not measure the CSI for any subframes in NB2.

In the example illustrated in FIG. 10B, the spectral efficiency used for the CQI measurement for wideband and narrowband CSI may be the same. The CSI measurement may be determined by adding the spectral efficiencies in the last received four subframes (e.g., subframe 1, subframe 2, subframe 3, subframe 4) as seen below in equation 7.

$$SE = SE_1 + SE_2 + SE_3 + SE_4 \quad (7)$$

Figure 11A:
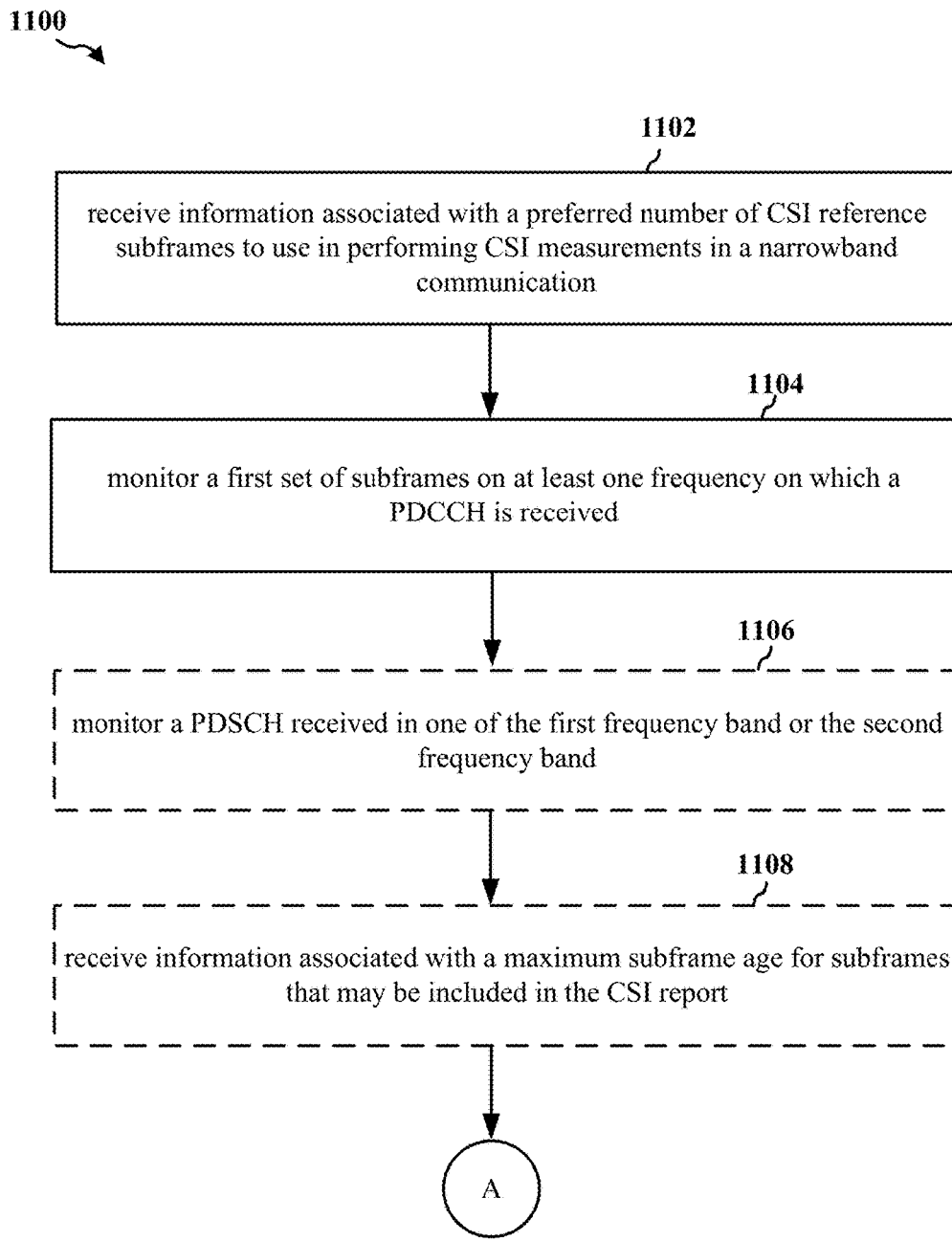
FIGS. 11A and 11B are a flowchart of a method of wireless communication.
Figure 11B:
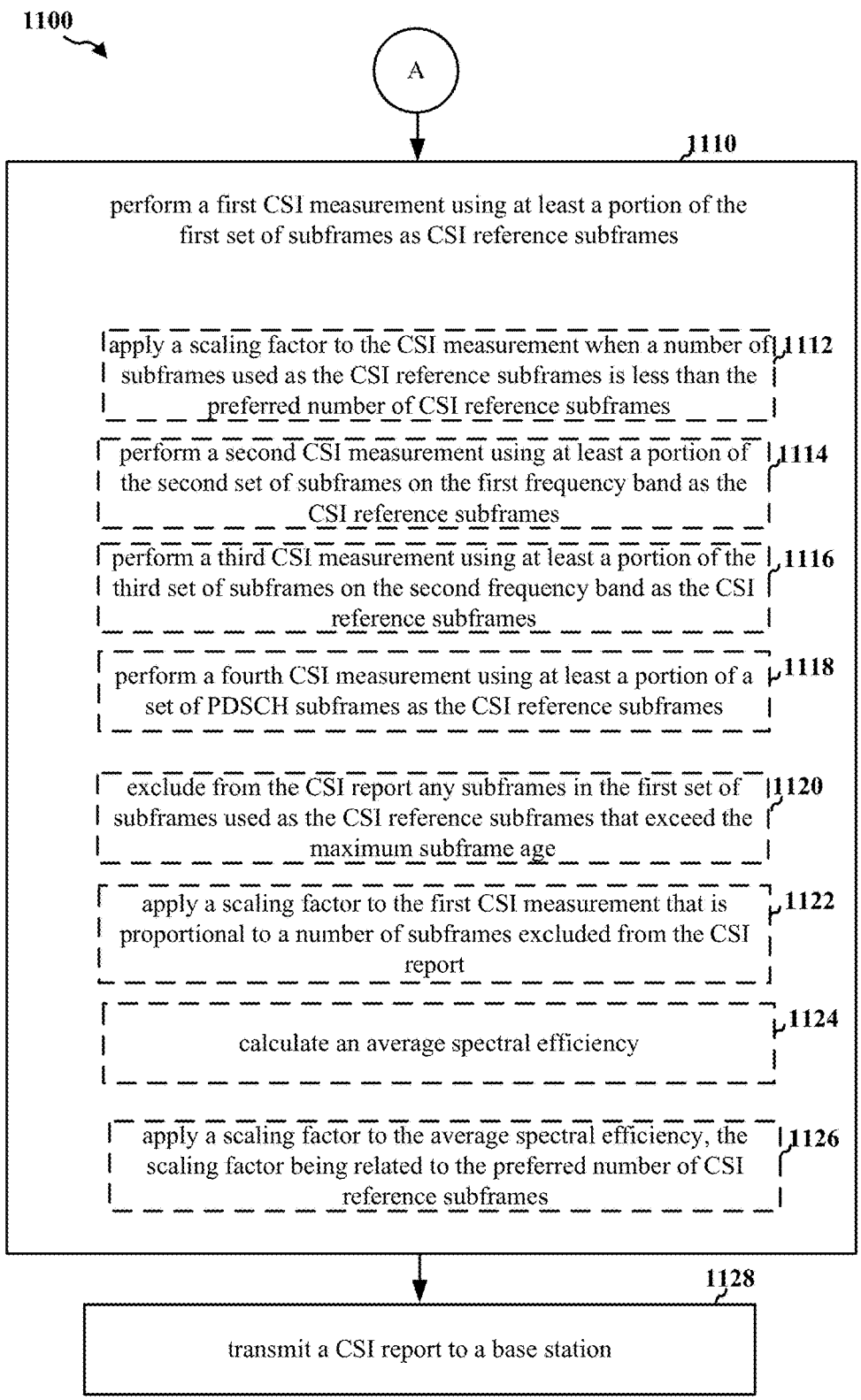

FIGS. 11A and 11B are a flowchart 1100 of a method of wireless communication. The method may be performed by a UE (e.g., the UE 104, 350, 406, the apparatus 1302/1302') communicating with an eNB (e.g., the eNB 102, 310, 404, 1350). Operations indicated with dashed lines represent optional operations for various aspects of the disclosure.

As seen in FIG. 11A, at 1102, the UE may receive information associated with a preferred number of CSI reference subframes to use in performing CSI measurements in a narrowband communication. In an aspect, the narrowband communication may be an eMTC or an NB-IoT communication. For example, referring to FIG. 4, the eNB 404 may transmit information 410 associated with a preferred number of CSI reference subframes for the UE 406 to use in performing CSI measurements for eMTC with the eNB 404. For example, the information 410 associated with the preferred number of CSI reference subframes may be indicated as R_CSIMax.

At 1104, the UE may monitor a first set of subframes on at least one frequency on which a PDCCH is received. For example, referring to FIG. 4, the UE 406 may monitor a set of subframes 405 on at least one frequency on which a PDCCH is received from the eNB 404.

At 1106, the UE may monitor a PDSCH received in one of the first frequency band or the second frequency band. For example, FIG. 8 illustrates subframes 802 on two different frequencies (e.g., NB1 and NB2) on which a PDCCH is received. In addition, FIG. 8 illustrates a third frequency (e.g., NB3) on which a PDSCH is received.

At 1108, the UE may receive information associated with a maximum subframe age for subframes that may be included in the CSI report. For example, referring to FIG. 4, the UE 406 may receive information associated with a maximum subframe age (e.g., R_Max_Delay) for subframes that may be included in the CSI report.

As seen in FIG. 11B, at 1110, the UE may perform a first CSI measurement using at least a portion of the first set of subframes as CSI reference subframes. For example, referring to FIG. 6, the UE 406 may perform the CSI measurement using both a portion of the set of subframes on NB1 and a portion of the set of subframes on NB2 as the CSI reference subframes 604. In the example illustrated in FIG. 6, the last R_CSIMax (e.g., R_CSIMax=4) observed in each of NB1 and NB2 are used as the CSI reference subframes 604.

When a number of subframes used as the CSI reference subframes is less than the preferred number of CSI reference subframes, at 1112, the UE may generate a first CSI measurement by applying a scaling factor to the CSI measurement. For example, referring to FIG. 4, the UE 406 may compute the CSI measurement by applying a scaling factor to the CSI measurement. The scaling factor may be proportional to the preferred number of CSI reference subframes. For example, the R_CSIMax used to generate a scaling value for the spectral efficiency estimation when the number of subframes used to perform the CSI measurement is less than R_CSIMax. Here, there may be no mapping of CSI reference resources to a set of subframes. In addition, determining how to deal with outdated CSI measurements may be left to UE implementation. Additionally and/or alternatively, the UE 406 may perform the CSI measurement by calculating an average spectral efficiency 405 and applying a scaling factor to the average spectral efficiency. For example, the average spectral efficiency may include at least one of a weighted average, an exponential average, or another type of average.

When the first set of subframes includes a second set of subframes on a first frequency band and a third set of subframes on a second frequency band, at 1114, the UE may perform the CSI measurement by performing a second CSI measurement using at least a portion of the second set of subframes on the first frequency band as the CSI reference subframes. For example, referring to FIG. 6, the UE 406 may perform the CSI measurement using both a portion of the set of subframes on NB1 and a portion of the set of subframes on NB2 as the CSI reference subframes 604. In the example illustrated in FIG. 6, the last R_CSIMax (e.g., R_CSIMax=4) observed in each of NB1 and NB2 are used as the CSI reference subframes 604.

When the first set of subframes includes a second set of subframes on a first frequency band and a third set of subframes on a second frequency band, at 1116, the UE may perform the CSI measurement by performing a third CSI measurement using at least a portion of the third set of subframes on the second frequency band as the CSI reference subframes. For example, referring to FIG. 6, the last R_CSIMax (e.g., R_CSIMax=4) observed in each of NB1 and NB2 are used as the CSI reference subframes 604.

At 1118, the UE may perform the CSI measurement by performing a fourth CSI measurement using at least a portion of a set of PDSCH subframes as the CSI reference subframes. For example, referring to FIG. 4, the UE 406 may monitor a PDSCH received in one of the first frequency band or the second frequency band. Here, the UE 406 may perform the CSI measurement 405 using at least a portion of a set of PDSCH subframes as the CSI reference subframes when the PDSCH subframes are received in the same frequency band as the PDCCH subframes.

At 1120, the UE may perform the CSI measurement by excluding from the CSI report any subframes in the first set of subframes used as the CSI reference subframes that exceed the maximum subframe age. For example, referring to FIG. 9, the UE 406 may perform the CSI measurement using the last R_CSIMax (e.g., R_CSIMax=4) observed in each NB1 and NB2 that do not include the MBSFN subframe 906 and are not outdated (e.g., older than R_Max_Delay). For example, with respect to NB1, R_CSIMax includes the last three subframes 902 and the fifth to last subframe 902 (e.g., omitting the last subframe that is an MBSFN subframe 906). With respect to NB2, R_CSIMax includes four subframes 902 adjacent to the last subframe (e.g., omitting the last subframe that is an MBSFN subframe 906). However, since the last two subframes 910 in R_CSIMax are older than R_Max_Delay, the UE 406 omits these two CSI reference subframes from the CSI measurement.

At 1122, the UE may perform the CSI measurement by apply a scaling factor to the first CSI measurement that is proportional to a number of subframes excluded from the CSI report. For example, referring to FIG. 4, the UE 406 may perform the CSI measurement by applying a scaling factor 405 that is proportional to a number of subframes excluded from the CSI report.

At 1124, the UE may calculate an average spectral efficiency. For example, referring to FIG. 4, the UE 406 may perform the CSI measurement by calculating an average spectral efficiency 405 and applying a scaling factor to the average spectral efficiency. For example, the average spectral efficiency may include at least one of a weighted average, an exponential average, or another type of average.

At 1126, the UE may apply a scaling factor to the average spectral efficiency, the scaling factor being related to the preferred number of CSI reference subframes. For example, referring to FIG. 4, the UE 406 may perform the CSI measurement by calculating an average spectral efficiency 405 and applying a scaling factor to the average spectral efficiency. For example, the average spectral efficiency may include at least one of a weighted average, an exponential average, or another type of average.

At 1128, the UE may transmit a CSI report to a base station. For example, referring to FIG. 4, the CSI measurements may be transmitted in a CSI report 420 to the eNB 404.

Figure 12:
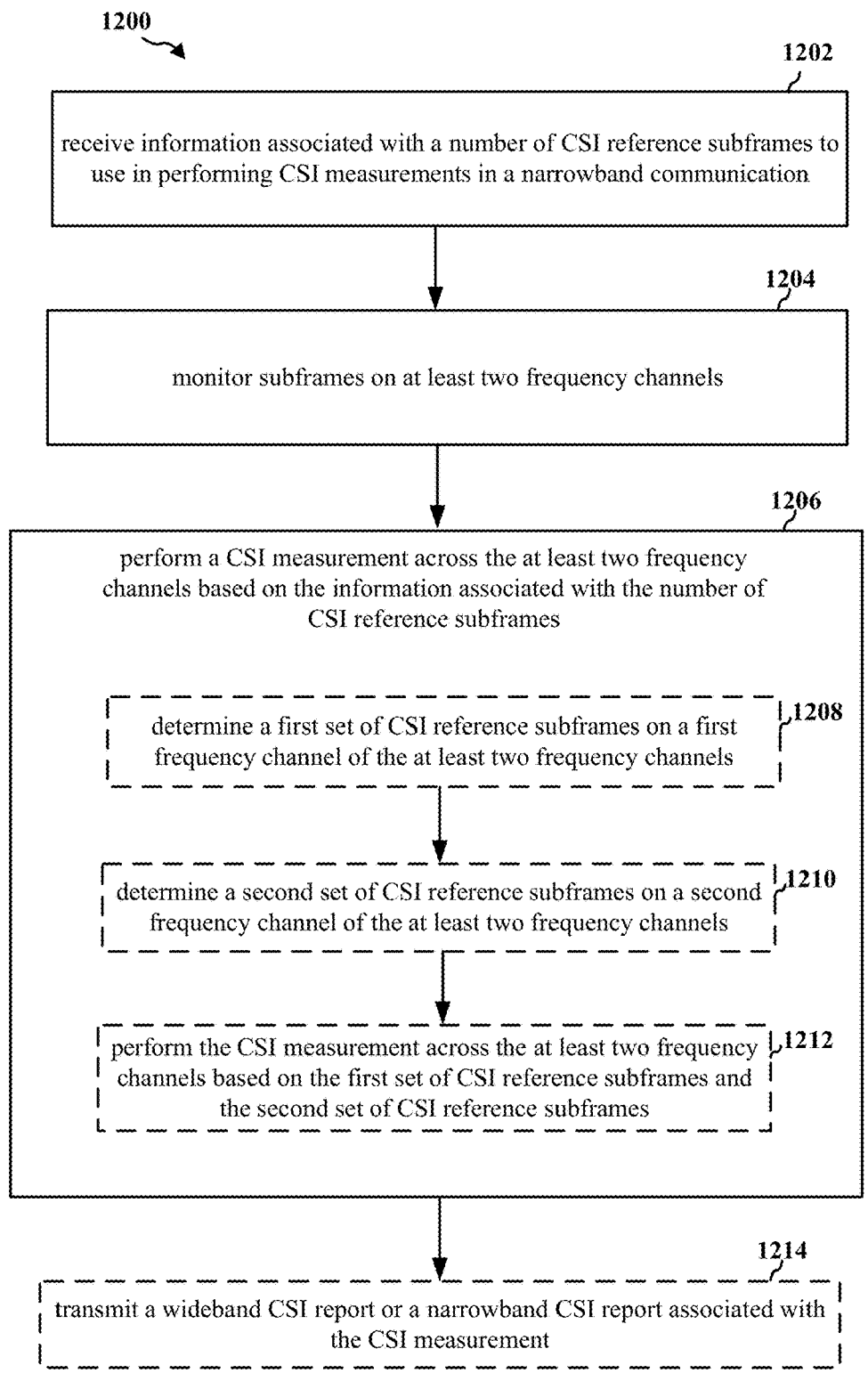
FIG. 12 is a flowchart of a method of wireless communication.

FIG. 12 is a flowchart 1200 of a method of wireless communication. The method may be performed by a UE (e.g., the UE 104, 350, 406, the apparatus 1302/1302') in communication with an eNB (e.g., the eNB 102, 310, 404, 1350). Operations indicated with dashed lines represent optional operations for various aspects of the disclosure.

At 1202, the UE may receive information associated with a number of CSI reference subframes to use in performing CSI measurements in a narrowband communication. In an aspect, each CSI reference subframe may be a downlink subframe or a special subframe. In another aspect, the number of CSI reference subframes may be greater than or equal to four for periodic CSI reporting or aperiodic CSI reporting. The narrowband communication may be an eMTC or an NB-IoT communication. For example, referring to FIG. 4, the eNB 404 may transmit information 410 associated with a preferred number of CSI reference subframes for the UE 406 to use in performing CSI measurements for eMTC with the eNB 404. For example, the information 410 associated with the preferred number of CSI reference subframes may be indicated as R_CSIMax.

At 1204, the UE may monitor subframes on at least two frequency channels. In an aspect, each of the at least two frequency channels may include a PDCCH. For example, referring to FIG. 4, the UE 406 may monitor a set of subframes 405 on at least one frequency on which a PDCCH is received from the eNB 404.

At 1206, the UE may perform a CSI measurement across the at least two frequency channels based on the information associated with the number of CSI reference subframes. For example, referring to FIGS. 6 and 10A, the UE 406 may perform the CSI measurement across NB1 and NB2 by determining a first set of CSI reference subframes 1004a on NB1 and determining a second set of CSI reference subframes 1004b on NB2. In other words, the CSI measurement may be performed using the first set of CSI reference subframes 1004a and the second set of CSI reference subframes 1004b.

At 1208, the UE may perform the CSI measurement by determining a first set of CSI reference subframes on a first frequency channel of the at least two frequency channels. In an aspect, the first set of CSI reference subframes may include M reference subframes. In another aspect, M may be equal to the number of CSI reference subframes divided by a number of the at least two frequency channels. In another aspect, the first set of CSI reference subframes may include N reference subframes. In another aspect, N may be equal to the number of CSI reference subframes. For example, referring to FIG. 6, the first set of CSI reference subframes 1004a and the second set of CSI reference subframes 1004b each comprise N reference subframes. For example, N may be equal to the number of the last CSI reference subframes ($R^{CSI}$) measured before subframe n-$n_{CQI\_ref}$ on each of the narrowbands on which the UE 406 monitors the PDCCH. Additionally, referring to FIG. 10A, the first set of CSI reference subframes 1004a and the second set of CSI reference subframes 1004b each comprise M reference subframes. For example, M may be equal to the number of the last CSI reference subframes ($R^{CSI}$) measured before subframe n-$n_{CQI\_ref}$ divided by the number of narrowbands ($N_{NB,hop}^{ch,DL}$) on which the UE 406 monitors the PDCCH.

At 1210, the UE may perform the CSI measurement by determining a second set of CSI reference subframes on a second frequency channel of the at least two frequency channels. In an aspect, the first frequency channel may be different than the second frequency channel. In an aspect, the second set of CSI reference subframes may include N reference subframes. In another aspect, N may be equal to the number of CSI reference subframes. In a further aspect, a number of reference subframes in the first set of CSI reference subframes is equal to a number of reference subframes in the second set of CSI reference subframes. For example, referring to FIG. 6, the first set of CSI reference subframes 1004a and the second set of CSI reference subframes 1004b each comprise N reference subframes. For example, N may be equal to the number of the last CSI reference subframes ($R^{CSI}$) measured before subframe n-$n_{CQI\_ref}$ on each of the narrowbands on which the UE 406 monitors the PDCCH. Additionally, referring to FIG. 10A, the first set of CSI reference subframes 1004a and the second set of CSI reference subframes 1004b each comprise M reference subframes. For example, M may be equal to the number of the last CSI reference subframes ($R^{CSI}$) measured before subframe n-$n_{CQI\_ref}$ divided by the number of narrowbands ($N_{NB,hop}^{ch,DL}$) on which the UE 406 monitors the PDCCH.

At 1212, the UE may perform the CSI measurement across the at least two frequency channels based on the first set of CSI reference subframes and the second set of CSI reference subframes. For example, referring to FIG. 6, the UE 406 may perform SE averaging across the CSI reference subframes 604a, 604b in the set. Analogously, when performing subband selection, the UE 406 may report NB1 as the preferred narrowband. In other words, the UE 406 may perform the CSI measurement by averaging the SE across the CSI reference subframes 604a, 640b each of the narrowbands. For example, the wideband CSI measurement may be based on the eight observed subframes, with a normalization to compensate the increased number of subframes as seen above in equation 1. While the narrowband CQI measurement may be determined using equations 2 and 3 seen above. In addition, referring to FIG. 10A, R_CSIMax may be split between NB1 and NB2. For example, since there are 2 narrowbands and R_CSIMax=4, then each narrowband may have two subframes each that are used for measuring CSI, as depicted in FIG. 10A. Here, the CQI measurement for wideband may be obtained as seen above using equation 4. The two CSI measurements for narrowband may be scaled to meet the reference of four repetitions for PDSCH as seen above in equations 5 and 6.

At 1214, the UE may transmit a wideband CSI report or a narrowband CSI report. For example, referring to FIG. 4, the CSI measurements may be transmitted in a CSI report 420 to the eNB 404. In FIG. 10A, the CQI measurement for wideband may be obtained as seen above using equation 4. The two CSI measurements for narrowband may be scaled to meet the reference of four repetitions for PDSCH as seen above in equations 5 and 6.

Figure 13:
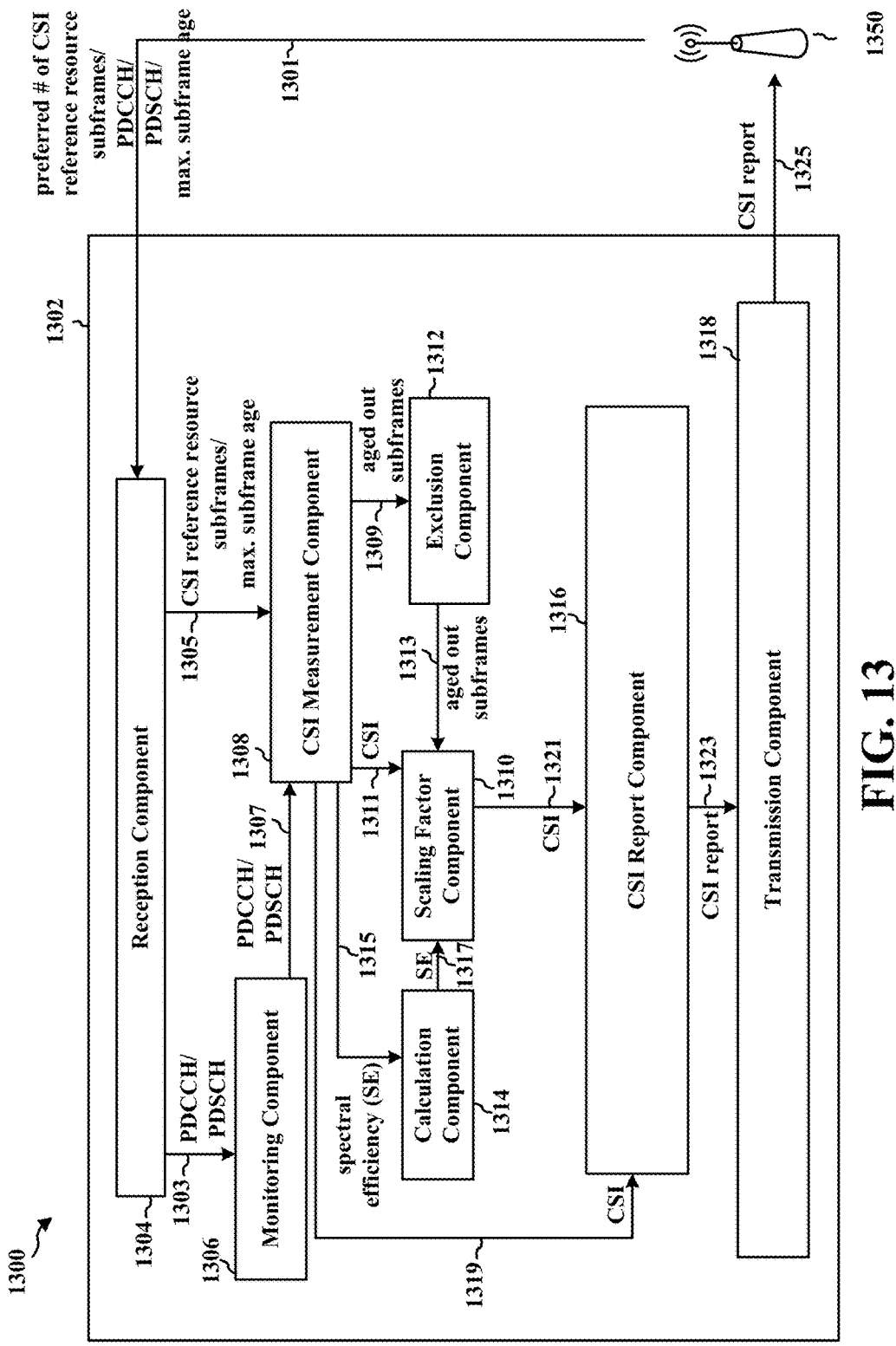
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a UE (e.g., UE 104, 350, 406). Reception component 1304 may receive information 1301 associated with one or more of a preferred number of CSI reference resource subframes, a PDCCH, a PDSCH, and/or a maximum subframe age to include in a CSI report from base station 1350. Reception component 1304 may send information 1303 associated with the PDCCH and/or PDSCH to a monitoring component 1306. Further, reception component 1304 may send information 1305 associated with the number of CSI reference resource subframes and/or the maximum subframe age to be included in the CSI report to CSI measurement component 1308. Monitoring component 1306 may monitor subframes on at least two frequency channels associated with the PDCCH and/or PDSCH. Monitoring component 1306 may send information 1307 associated with the PDCCH and/or PDSCH to the CSI measurement component 1308. CSI measurement component 1308 may perform a CSI measurement of CSI reference resources in the PDCCH and/or PDSCH. For example, CSI measurement component 1308 may perform a CSI measurement by determining a first set of CSI reference subframes on a first frequency channel. In addition, the CSI measurement component 1308 may perform the CSI measurement by determining a second set of CSI reference subframes on a second frequency channel. In an aspect, the first set of CSI reference subframes may include M reference subframes. In another aspect, M may be equal to the number of CSI reference subframes divided by a number of the frequency channels. In a further aspect, a number of reference subframes in the first set of CSI reference subframes may be equal to a number of reference subframes in the second set of CSI reference subframes. Still further, the first set of CSI reference subframes and the second set of CSI reference subframes may include N reference subframes. In another aspect, N may be equal to the number of CSI reference subframes. Further, CSI measurement component 1308 may perform the CSI measurement across the at least two frequency channels based on the first set of CSI reference subframes and the second set of CSI reference subframes. In addition, CSI measurement component 1308 may send information 1309 associated with aged out subframes to exclusion component 1312, information 1311 associated with the CSI measurement to calculation component 1314, information 1315 associated with a spectral efficiency of the CSI reference resource subframes to calculation component 1314, and/or information 1319 associated with the CSI measurement to CSI report component 1316. Calculation component 1314 may calculate a spectral efficiency as part of the CSI measurement. Calculation component 1314 may send information 1317 associated with the spectral efficiency to scaling factor component 1310. Exclusion component 1312 may exclude subframes that are older than the maximum age from the CSI measurement. Exclusion component 1312 may send information 1313 associated with the aged out subframes to scaling factor component 1310. Scaling factor component 1310 may apply a scaling factor to the CSI measurement (e.g., based on one or more of the spectral efficiency and/or aged out subframes). Scaling factor component 1310 may send information 1321 associated with the CSI measurement that includes the scaling factor to CSI report component 1316. CSI report component 1316 may generate a narrowband and/or wideband CSI report based on the information 1319, 1321 received from one or more of CSI measurement component 1308 and/or scaling factor component 1310. CSI report component 1316 may send information 1323 associated with the CSI report to transmission component 1318. Transmission component 1318 may transmit information 1325 associated with the narrowband and/or wideband CSI report to the base station 1350.

The apparatus may include additional components that perform each of the blocks of the algorithm in the aforementioned flowcharts of FIGS. 11A, 11B, and 12, and the aspects described in connection with FIGS. 5-10. As such, each block in the aforementioned flowcharts of FIGS. 11A, 11B, and 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
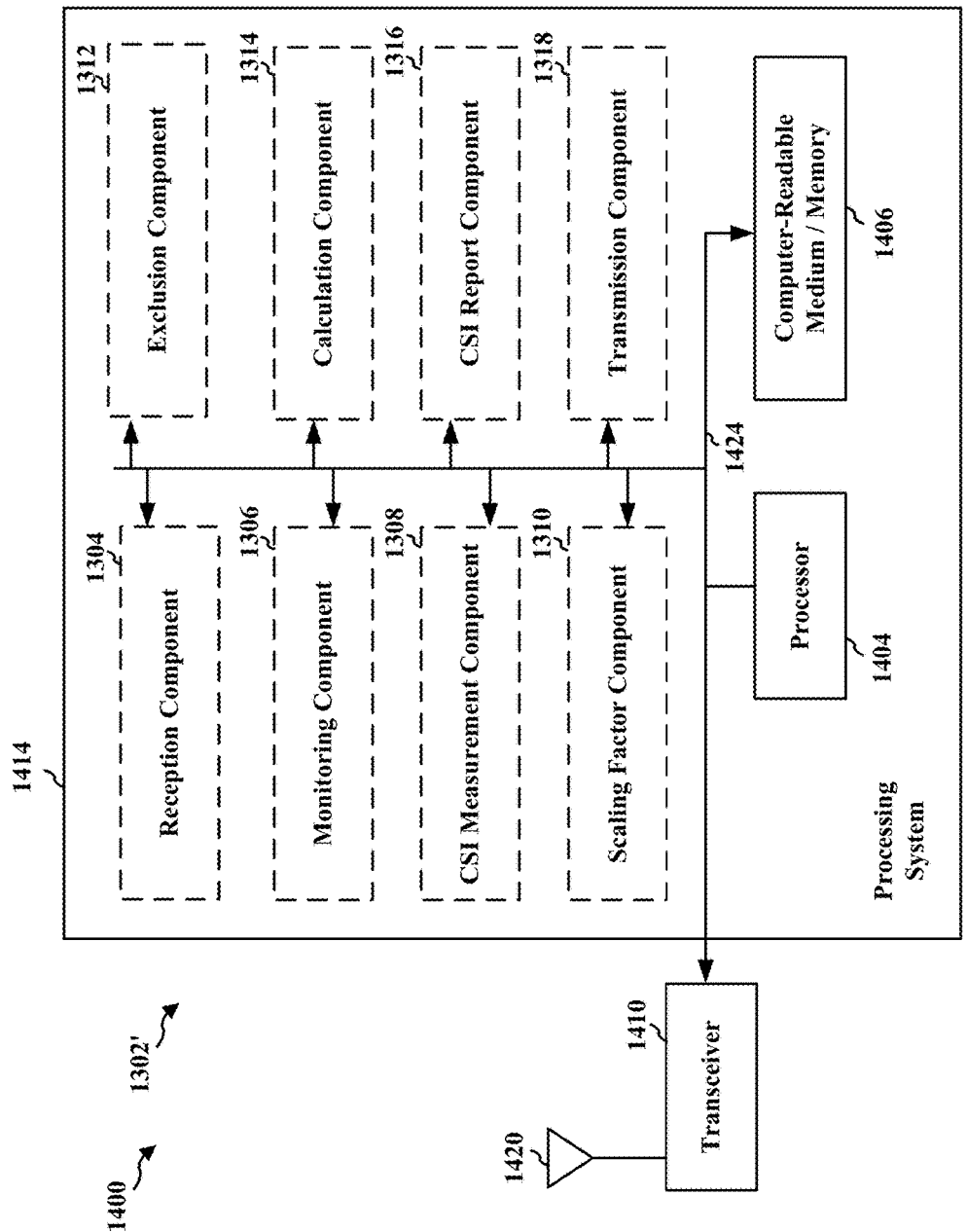
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312, 1314, 1316, 1318, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1318, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312, 1314, 1316, 1318. The components may be software components running in the processor 1404, resident/stored in the computer readable medium/memory 1406, one or more hardware components coupled to the processor 1404, or some combination thereof. The processing system 1414 may be a component of the UE 350 and may include the memory 360 and/or at least one of the TX processor 368, the RX processor 356, and the controller/processor 359.

In one configuration, the apparatus 1302/1302' for wireless communication may include means for receiving information associated with a number of CSI reference subframes to use in performing CSI measurements in a narrowband communication. In one aspect, each CSI reference subframe may be a downlink subframe or a special subframe. In another aspect, the number of CSI reference subframes may be greater than or equal to four for periodic CSI reporting or aperiodic CSI reporting. The NB communication may be an eMTC or an NB-IoT communication. In another configuration, the apparatus 1302/1302' for wireless communication may include means for monitoring subframes on at least two frequency channels. In an aspect, each of the at least two frequency channels may include a PDCCH. In a further configuration, the apparatus 1302/1302' for wireless communication may include means for performing a CSI measurement across the at least two frequency channels based on the information associated with the number of CSI reference subframes. In one aspect, the means for performing the CSI measurement across the at least two frequency channels may be configured to determine a first set of CSI reference subframes on a first frequency channel of the at least two frequency channels. In another aspect, the means for performing the CSI measurement across the at least two frequency channels may be configured to determine a second set of CSI reference subframes on a second frequency channel of the at least two frequency channels. In one aspect, the first frequency channel may be different than the second frequency channel. In another aspect, the first set of CSI reference subframes may include M reference subframes. Further, M may be equal to the number of CSI reference subframes divided by a number of the at least two frequency channels. In another aspect, a number of reference subframes in the first set of CSI reference subframes may be equal to a number of reference subframes in the second set of CSI reference subframes. In a further aspect, the first set of CSI reference subframes and the second set of CSI reference subframes may include N reference subframes. In one aspect, N may be equal to the number of CSI reference subframes. In another aspect, the means for performing the CSI measurement across the at least two frequency channels may be configured to perform the CSI measurement across the at least two frequency channels based on the first set of CSI reference subframes and the second set of CSI reference subframes. In a further configuration, the apparatus 1302/1302' for wireless communication may include means for transmitting a wideband CSI report associated with the CSI measurement. The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communications, comprising:
receiving information associated with a number of channel state information (CSI) reference subframes to use in performing CSI measurements in a narrowband communication;
monitoring subframes on at least two frequency channels, each of the at least two frequency channels including a physical downlink control channel (PDCCH); and
performing a CSI measurement across the at least two frequency channels based on the information associated with the number of CSI reference subframes, wherein the performing of the CSI measurement across the at least two frequency channels comprises:
determining a first set of CSI reference subframes on a first frequency channel of the at least two frequency channels, wherein the first set of CSI reference subframes comprises M reference subframes, M being based on the number of CSI reference subframes divided by a number of the at least two frequency channels;
determining a second set of CSI reference subframes on a second frequency channel of the at least two frequency channels, the first frequency channel being different than the second frequency channel; and
performing the CSI measurement across the at least two frequency channels based on the first set of CSI reference subframes and the second set of CSI reference subframes.

2. The method of claim 1, wherein each CSI reference subframe is a downlink subframe or a special subframe.

3. The method of claim 1, wherein the number of CSI reference subframes is greater than or equal to four for periodic CSI reporting or aperiodic CSI reporting.

4. The method of claim 1, wherein a number of reference subframes in the first set of CSI reference subframes is equal to a number of reference subframes in the second set of CSI reference subframes.

5. The method of claim 4, further comprising transmitting a wideband CSI report associated with the CSI measurement.

6. The method of claim 1, wherein the first set of CSI reference subframes and the second set of CSI reference subframes comprise N reference subframes, N being based on the number of CSI reference subframes.

7. The method of claim 6, further comprising transmitting a subband CSI report associated with the CSI measurement.

8. An apparatus for wireless communication, comprising:
means for receiving information associated with a number of channel state information (CSI) reference subframes to use in performing CSI measurements in a narrowband communication;
means for monitoring subframes on at least two frequency channels, each of the at least two frequency channels including a physical downlink control channel (PDCCH); and
means for performing a CSI measurement across the at least two frequency channels based on the information associated with the number of CSI reference subframes, wherein the means for performing the CSI measurement across the at least two frequency channels is configured to:
determine a first set of CSI reference subframes on a first frequency channel of the at least two frequency channels, wherein the first set of CSI reference subframes comprises M reference subframes, M being based on the number of CSI reference subframes divided by a number of the at least two frequency channels;
determine a second set of CSI reference subframes on a second frequency channel of the at least two frequency channels, the first frequency channel being different than the second frequency channel; and
perform the CSI measurement across the at least two frequency channels based on the first set of CSI reference subframes and the second set of CSI reference subframes.

9. The apparatus of claim 8, wherein each CSI reference subframe is a downlink subframe or a special subframe.

10. The apparatus of claim 8, wherein the number of CSI reference subframes is greater than or equal to four for periodic CSI reporting or aperiodic CSI reporting.

11. The apparatus of claim 8, wherein a number of reference subframes in the first set of CSI reference subframes is equal to a number of reference subframes in the second set of CSI reference subframes.

12. The apparatus of claim 11, further comprising means for transmitting a wideband CSI report associated with the CSI measurement.

13. The apparatus of claim 8, wherein the first set of CSI reference subframes and the second set of CSI reference subframes comprise N reference subframes, N being based on the number of CSI reference subframes.

14. The apparatus of claim 13, further comprising means for transmitting a subband CSI report associated with the CSI measurement.

15. An apparatus for wireless communication, comprising:
a memory; and
at least one processor coupled to the memory and configured to:
receive information associated with a number of channel state information (CSI) reference subframes to use in performing CSI measurements in a narrowband communication;
monitor subframes on at least two frequency channels, each of the at least two frequency channels including a physical downlink control channel (PDCCH); and
perform a CSI measurement across the at least two frequency channels based on the information associated with the number of CSI reference subframes;
wherein the at least one processor is configured to perform the CSI measurement across the at least two frequency channels by:
determining a first set of CSI reference subframes on a first frequency channel of the at least two frequency channels, wherein the first set of CSI reference subframes comprises M reference subframes, M being based on the number of CSI reference subframes divided by a number of the at least two frequency channels;
determining a second set of CSI reference subframes on a second frequency channel of the at least two frequency channels, the first frequency channel being different than the second frequency channel; and performing the CSI measurement across the at least two frequency channels based on the first set of CSI reference subframes and the second set of CSI reference subframes.

16. The apparatus of claim 15, wherein a number of reference subframes in the first set of CSI reference subframes is equal to a number of reference subframes in the second set of CSI reference subframes.

17. The apparatus of claim 16, wherein the at least one processor is further configured to transmit a wideband CSI report associated with the CSI measurement.

18. The apparatus of claim 15, wherein the first set of CSI reference subframes and the second set of CSI reference subframes comprise N reference subframes, N being based on the number of CSI reference subframes.

19. The apparatus of claim 18, wherein the at least processor is configured to transmit a subband CSI report associated with the CSI measurement.

20. A non-transitory computer-readable medium storing computer executable code, comprising code to:
receive information associated with a number of channel state information (CSI) reference subframes to use in performing CSI measurements in a narrowband communication;
monitor subframes on at least two frequency channels, each of the at least two frequency channels including a physical downlink control channel (PDCCH); and
perform a CSI measurement across the at least two frequency channels based on the information associated with the number of CSI reference subframes, wherein the code is configured to perform the CSI measurement across the at least two frequency channels by:
determining a first set of CSI reference subframes on a first frequency channel of the at least two frequency channels, wherein the first set of CSI reference subframes comprises M reference subframes, M being based on the number of CSI reference subframes divided by a number of the at least two frequency channels;
determining a second set of CSI reference subframes on a second frequency channel of the at least two frequency channels, the first frequency channel being different than the second frequency channel; and
performing the CSI measurement across the at least two frequency channels based on the first set of CSI reference subframes and the second set of CSI reference subframes.

21. The non-transitory computer-readable medium of claim 20, wherein a number of reference subframes in the first set of CSI reference subframes is equal to a number of reference subframes in the second set of CSI reference subframes.

22. The non-transitory computer-readable of claim 21, wherein the code is further configured to transmit a wideband CSI report associated with the CSI measurement.

* * * * *